(12) United States Patent
Kim et al.

(10) Patent No.: US 8,587,751 B2
(45) Date of Patent: Nov. 19, 2013

(54) DISPLAY PANEL AND DISPLAY APPARATUS HAVING THE SAME

(75) Inventors: Dong-hwan Kim, Seoul (KR); Seong-eun Chung, Seoul (KR); Il-yong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 13/208,771

(22) Filed: Aug. 12, 2011

(65) Prior Publication Data
US 2012/0206678 A1  Aug. 16, 2012

Related U.S. Application Data

(60) Provisional application No. 61/442,394, filed on Feb. 14, 2011.

(30) Foreign Application Priority Data

Apr. 22, 2011 (KR) ........................ 10-2011-0037630

(51) Int. Cl.
*G02F 1/1335* (2006.01)
(52) U.S. Cl.
USPC ............................................. 349/106; 349/96
(58) Field of Classification Search
None
See application file for complete search history.

(56) References Cited

U.S. PATENT DOCUMENTS

| | | | |
|---|---|---|---|
| 6,040,936 A | 3/2000 | Kim et al. | |
| 7,375,887 B2 | 5/2008 | Hansen et al. | |
| 7,414,784 B2 | 8/2008 | Mi et al. | |
| 7,420,156 B2 | 9/2008 | Kim et al. | |
| 7,468,838 B2 | 12/2008 | Cha et al. | |
| 7,697,203 B2 | 4/2010 | Cha et al. | |
| 8,125,592 B2 | 2/2012 | Takada | |
| 8,199,282 B2 | 6/2012 | Sugita et al. | |
| 2004/0174491 A1 | 9/2004 | Kao et al. | |
| 2006/0056024 A1 | 3/2006 | Ahn et al. | |
| 2007/0019292 A1 | 1/2007 | Kim et al. | |
| 2008/0094547 A1 | 4/2008 | Sugita et al. | |
| 2008/0100781 A1 | 5/2008 | Choo et al. | |
| 2008/0135739 A1 | 6/2008 | Kim et al. | |

(Continued)

FOREIGN PATENT DOCUMENTS

| JP | 2007-025692 A | 2/2007 |
|---|---|---|
| JP | 2008-102416 A | 5/2008 |

(Continued)

OTHER PUBLICATIONS

Communication dated Jul. 31, 2012 issued by the Korean Intellectual Property Office in counterpart Korean Patent Application No. 10-2011-0037630.

(Continued)

*Primary Examiner* — Thanh-Nhan P Nguyen
(74) *Attorney, Agent, or Firm* — Sughrue Mion, PLLC

(57) ABSTRACT

A display panel and a display apparatus having the same, in which the display panel comprises a liquid crystal layer comprising first and second substrates which are disposed opposite to each other; and a color filter layer which is formed on a surface of one of the first and second substrates facing each other, and includes a first metal linear grid arranged at different pitches to emit a first polarized component of incident light with different colors. The provided display panel and display apparatus have decreased manufacturing costs and simplified manufacturing process.

29 Claims, 28 Drawing Sheets

(56) References Cited

U.S. PATENT DOCUMENTS

| | | | |
|---|---|---|---|
| 2008/0143638 A1 | 6/2008 | Kim et al. | |
| 2008/0192346 A1 | 8/2008 | Kim et al. | |
| 2008/0252799 A1 | 10/2008 | Lee et al. | |
| 2008/0303987 A1* | 12/2008 | Kumai | 349/96 |
| 2008/0316599 A1 | 12/2008 | Wang et al. | |
| 2009/0273744 A1 | 11/2009 | Wang et al. | |
| 2009/0278954 A1 | 11/2009 | Kanamori et al. | |
| 2009/0310044 A1* | 12/2009 | Lee | 349/15 |
| 2010/0046060 A1 | 2/2010 | Lee et al. | |
| 2010/0091217 A1 | 4/2010 | Kim et al. | |

FOREIGN PATENT DOCUMENTS

| | | |
|---|---|---|
| JP | 2009-42319 A | 2/2009 |
| JP | 2010-049017 A | 3/2010 |
| JP | 4500360 B2 | 7/2010 |
| JP | 2010-286848 A | 12/2010 |
| KR | 10-0483352 B1 | 4/2005 |
| KR | 10-0600037 B1 | 7/2006 |
| KR | 1020060105350 A | 10/2006 |
| KR | 1020060105351 A | 10/2006 |
| KR | 10-0662046 B1 | 12/2006 |
| KR | 10-2007-0010472 A | 1/2007 |
| KR | 10-0716669 B1 | 5/2007 |
| KR | 1020080004880 A | 1/2008 |
| KR | 10-0824782 B1 | 4/2008 |
| KR | 10-0825905 B1 | 4/2008 |
| KR | 1020080075753 A | 8/2008 |
| KR | 1020090025590 A | 3/2009 |
| KR | 10-2010-0009001 A | 1/2010 |
| KR | 1020100084865 A | 7/2010 |
| KR | 101007198 B1 | 1/2011 |

OTHER PUBLICATIONS

Communication dated Aug. 31, 2012 issued by the Korean Intellectual Property Office in counterpart Korean Patent Application No. 10-2011-0037632.
Communication dated Sep. 26, 2012 issued by the International Searching Authority in counterpart International Application No. PCT/KR2012/000159.
Communication dated Oct. 4, 2012 issued by the International Searching Authority in counterpart International Application No. PCT/KR2012/000158.
Communication dated Oct. 4, 2012 issued by the International Searching Authority in counterpart International Application No. PCT/KR2012/000161.
Communication dated Dec. 28, 2012 from the Korean Intellectual Property Office in counterpart Korean application No. 10-2011-0037631.
Communication dated Nov. 14, 2012 from the Korean Intellectual Property Office in counterpart Korean application No. 10-2011-0037630.
Catrysse, P., et al., "One-mode model for patterned metal layers inside integrated color pixels", Optics Letters, May 2004, pp. 974-976, vol. 29, No. 9.
Ebbesen, T.W., et al., "Extraordinary optical transmission through sub-wavelength hole arrays", Nature, Feb. 1998, pp. 667-669, vol. 391.
Lee, H.-S., et al., "Color Filter Based on a Sub-wavelength Patterned Metal Grating", Hankook Kwanghak Hoeji, Dec. 2007, pp. 383-388, vol. 18, No. 6, Abstract.
Xu, T., et al., "Plasmonic nanoresonators for high-resolution colour filtering and spectral imaging", Nature Communications, Aug. 2010, pp. 1-5.
Ye, et al., "Efficiency improvement for a polarizing color filter based on submicron metal grating", 2010, vol. 7848, pp. 1-8, XP040546046.
Xu, et al., "Nanostructured metal-insulator-metal resonators for high-resolution color filtering and spectral imaging", Jan. 24, 2011, vol. 7946, pp. 1-6, XP040555106.
Communication dated Apr. 18, 2012 issued by the European Patent Office in counterpart European Patent Application No. 11179626.4.
Communication dated Apr. 18, 2012 issued by the European Patent Office in counterpart European Patent Application No. 11177489.9.
Communication dated Apr. 18, 2012 issued by the European Patent Office in counterpart European Patent Application No. 11177487.3.
Communication dated Apr. 18, 2012 issued by the European Patent Office in counterpart European Patent Application No. 11179633.0.
Communication dated Jun. 3, 2013 from the Korean Intellectual Property Office in a counterpart application No. 10-2011-0037632.
Communication from the Japanese Patent Office dated Jun. 4, 2013, in a counterpart Japanese application No. 2012-025201.
USPTO Office Action dated Jun. 20, 2013 issued in co-pending U.S. Appl. No. 13/209,028.
USPTO Office Action dated Jun. 20, 2013 issued in co-pending U.S. Appl. No. 13/208,886.

* cited by examiner

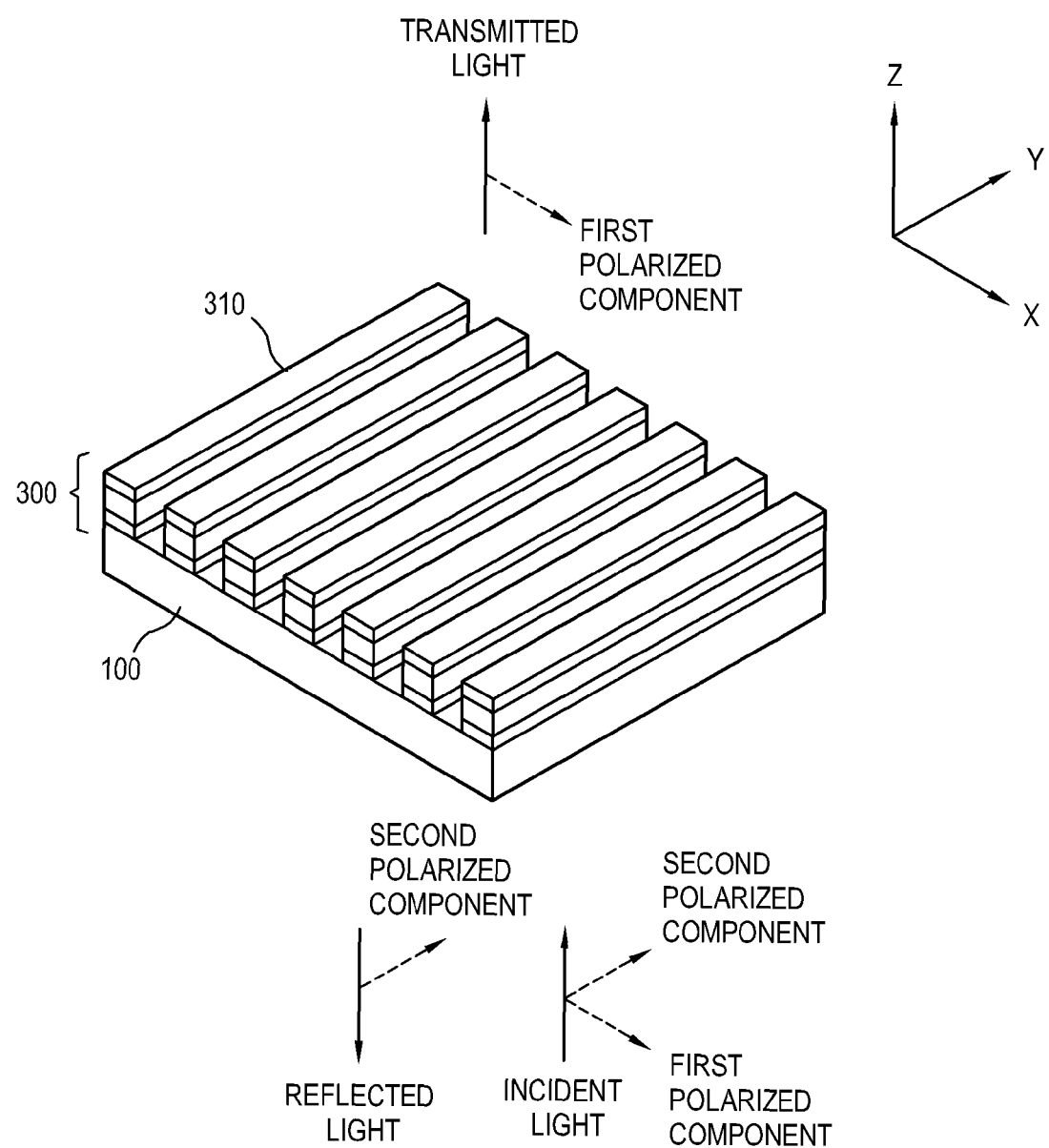

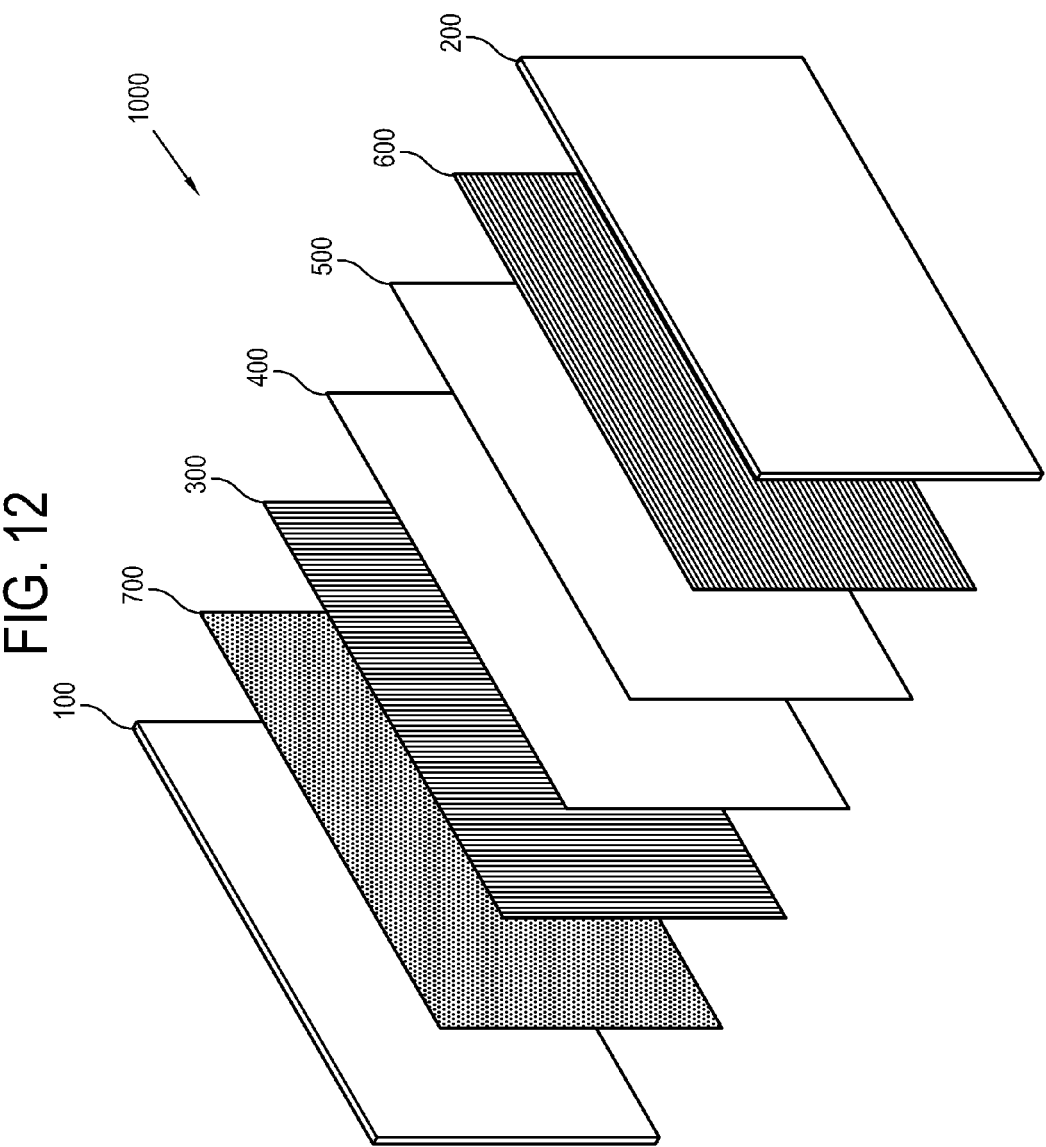

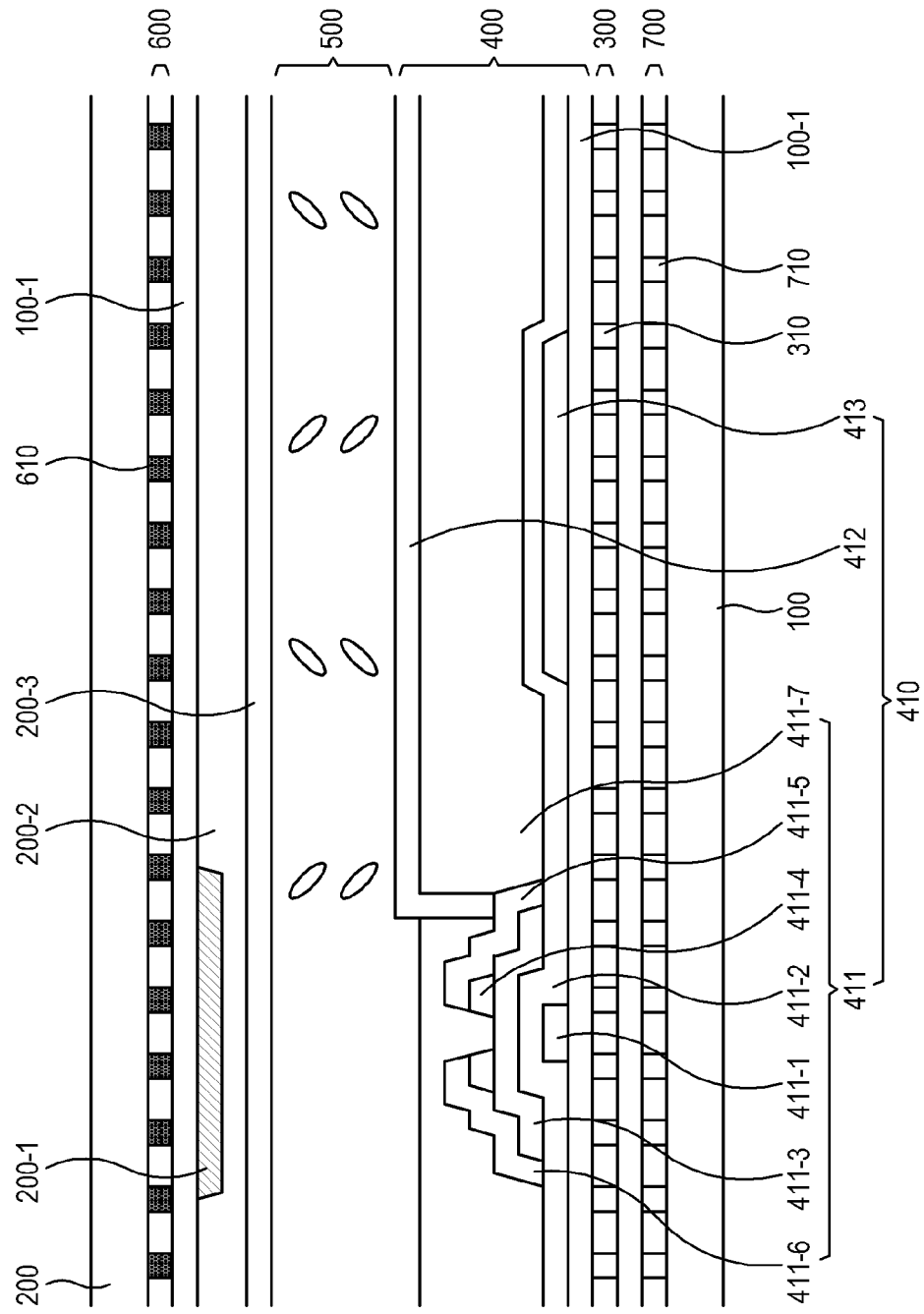

DISPLAY PANEL AND DISPLAY APPARATUS HAVING THE SAME

CROSS-REFERENCE TO RELATED APPLICATIONS

This application claims the benefit of U.S. Provisional Patent Application No. 61/442,394, filed on Feb. 14, 2011 in the United States Patent and Trademark Office and Korean Patent Application No. 10-2011-0037630, filed on Apr. 22, 2011 in the Korean Intellectual Property Office, the disclosures of which are incorporated herein by reference.

BACKGROUND

1. Field

Apparatuses and methods consistent with the exemplary embodiments relate to a display panel and a display apparatus including the same, and more particularly, to a display panel including a liquid crystal layer and a display apparatus including the same.

2. Description of the Related Art

A liquid crystal display (LCD) panel includes first and second substrates having a liquid crystal layer therebetween, and a polarizing film for polarizing light incident to the first and second substrates. Also, the LCD panel internally includes a color filter layer in the form of dye in order to represent color with light. While the incident light passes through the polarizing film and the color filter layer, the optical efficiency of the LCD panel is lowered. Meanwhile, the LCD panel may further include a dual brightness enhance film (DBEF) at a light-incident side so as to compensate for light loss due to polarization.

The polarizing film and the DBEF increase manufacturing costs of the LCD panel or of the display apparatus and makes the manufacturing process complicated.

SUMMARY

Accordingly, one or more exemplary embodiments provide a display panel and a display apparatus including the same, in which manufacturing costs are decreased and a manufacturing process is simplified.

Another exemplary embodiment provides a display panel having improved optical efficiency and a display apparatus including the same.

Still another exemplary embodiment provides a display apparatus which can a passive type stereoscopic image excellent in visibility.

The foregoing and/or other aspects may be achieved by providing a display panel with a liquid crystal layer, including first and second substrates which are disposed opposite to each other; and a color filter layer which is formed on one of the first and second substrates between the first and second substrates, and includes a first metal linear grid arranged at different pitches to emit a first polarized component of incident light with different colors.

The display panel may further include a first polarizing layer transmitting a second polarized component different from the first polarized component.

The first polarizing layer may include a second metal linear grid formed on the other surface between the first substrate and the second substrate.

The display panel may further include a second polarizing layer formed beneath the color filter layer and including a third metal linear grid capable of transmitting the first polarized component.

The first polarizing layer may include a polarizing film formed on an outer surface of the other one of the first substrate and the second substrate.

The display panel may further include a pixel layer formed on one surface between the first substrate and the second substrate and formed with a pixel including a plurality of sub pixels, and at least three sub pixels may be of a different pitch from the first metal linear grids.

The first metal linear grid may include a red metal linear grid, a green metal linear grid and a blue metal linear grid, and the red metal linear grid may be arranged at every pitch shorter than ½ of a red light wavelength, the green metal linear grid is arranged at every pitch shorter than ½ of a green light wavelength, and the blue metal linear grid is arranged at every pitch shorter than ½ of a blue light wavelength.

The first metal linear grid may include a first metal layer, an insulating layer, and a second metal layer stacked in sequence.

The height of the first metal linear grid may be larger than the width thereof.

The color filter layer may further include a dielectric layer stacked beneath the first metal linear grid.

The first metal linear grid may include a first polarizing linear grid transmitting the first polarized component, and a second polarizing linear grid transmitting the second polarized component, the color filter layer may be divided in the form of a checkerboard, and the first polarizing linear grid and the second polarizing linear grid are alternately formed in adjacent cells of the checkerboard.

The second metal linear grid may include a first polarizing linear grid transmitting the first polarized component, and a second polarizing linear grid transmitting the second polarized component, and the first polarizing linear grid of the second metal linear grid may correspond to the second polarizing linear grid of the first metal linear grid, and the second polarizing linear grid of the second metal linear grid may correspond to the first polarizing linear grid of the first metal linear grid.

The display panel may further include a pixel layer formed on one surface between the first substrate and the second substrate, and formed with a pixel including a plurality of sub pixels, wherein a cell of the checkerboard is formed to correspond to the pixel.

The first metal linear grid may include a first polarizing linear grid transmitting the first polarized component, and a second polarizing linear grid transmitting the second polarized component, the color filter layer may be divided into a plurality of rows or a plurality of columns, and the first polarizing linear grid and the second polarizing linear grid may be alternately formed in the rows or the columns.

The second metal linear grid may include a first polarizing linear grid transmitting the first polarized component, and a second polarizing linear grid transmitting the second polarized component, and the first polarizing linear grid of the second metal linear grid may correspond to the second polarizing linear grid of the first metal linear grid, and the second polarizing linear grid of the second metal linear grid may correspond to the first polarizing linear grid of the first metal linear grid.

The display panel may further include a pixel layer formed on one surface between the first substrate and the second substrate, and formed with a pixel including a plurality of sub pixels, wherein the row or the column is formed to correspond to a pixel row or a pixel column.

Another aspect may be achieved by providing a display apparatus including a display panel with a liquid crystal layer, which includes first and second substrates which are disposed opposite to each other, and a color filter layer which is formed on one of the first and second substrates between the first and second substrates, and includes a first metal linear grid arranged at different pitches to emit a first polarized component of incident light with different colors; and a backlight assembly which emits light to the display panel.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 2 is a view showing a color filter layer of FIG. 1;

FIG. 12 is a view showing a layer structure of a display panel according to still another exemplary embodiment;

FIG. 13 is a cross-section of the display panel of FIG. 12;

DETAILED DESCRIPTION OF THE EXEMPLARY EMBODIMENTS

Figure 1:
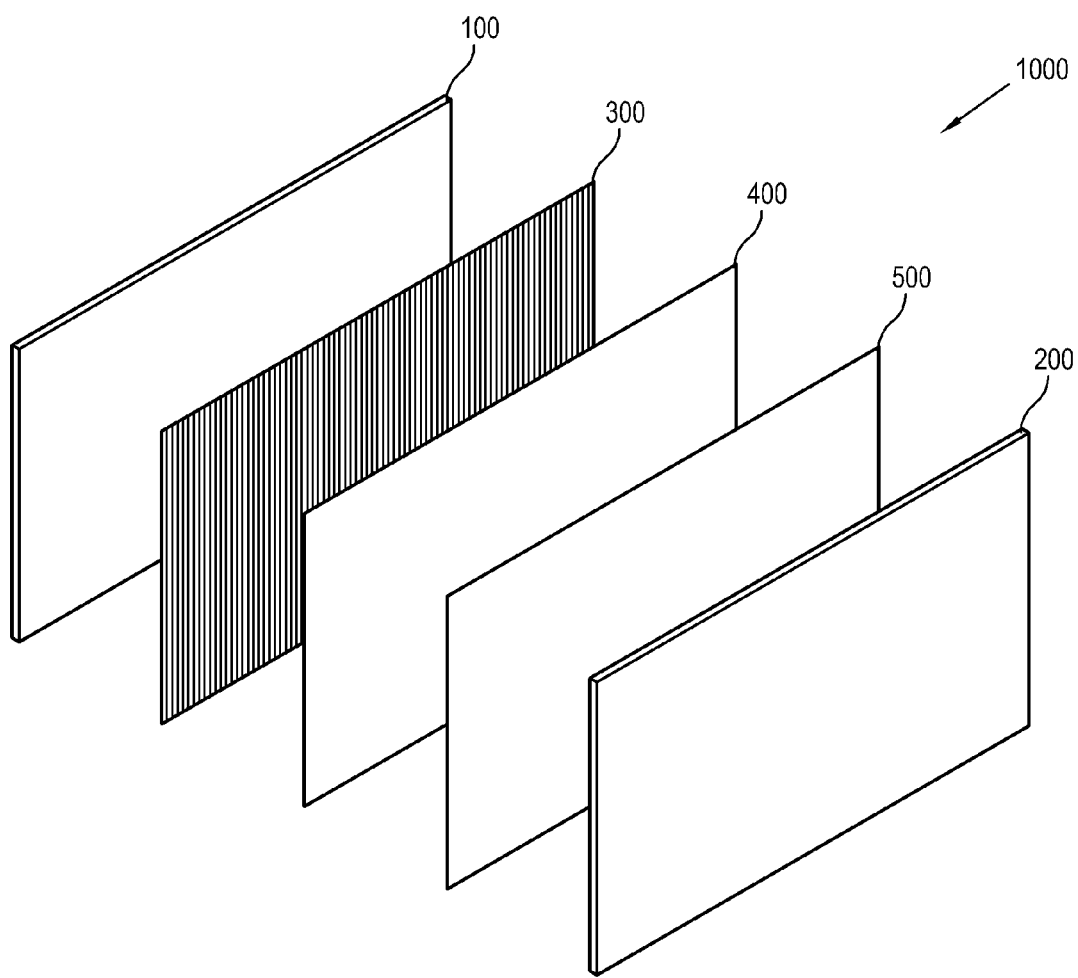
FIG. 1 shows a layer structure of a display panel according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 shows a layer structure of a display panel according to an exemplary embodiment.

As shown therein, a display panel 1000 in this exemplary embodiment includes first and second substrates 100 and 200 opposite to each other, and a color filter layer 300, a pixel layer 400 and a liquid crystal layer 500 arranged in sequence between the first and second substrates 100 and 200. The display panel 1000 including the liquid crystal layer 500 may be used in a television, home appliances such as a monitor, a cellular phone, a portable multimedia player (PMP), a Netbook, a notebook computer, a mobile terminal such as an E-book terminal or the like, a display apparatus for exhibition and advertisement, etc.

The color filter layer 300 and the pixel layer 400 are formed in sequence on the first substrate 100. The liquid crystal layer 500, whose alignment is adjusted by an applied voltage, is inserted between the first and second substrates 100 and 200. The array of the liquid crystal layer 500 is controlled in accordance with a twisted nematic (TN) mode, a vertical alignment (VA) mode, a patterned vertical alignment (PVA) mode, an in-plane switching (IPS) mode or the like operating mode of the display panel 1000. To improve an optical viewing angle, sub pixels are divided or patterned, the refractive index of the liquid crystal is uniformly adjusted, or the like technology may be used.

Figure 3A:
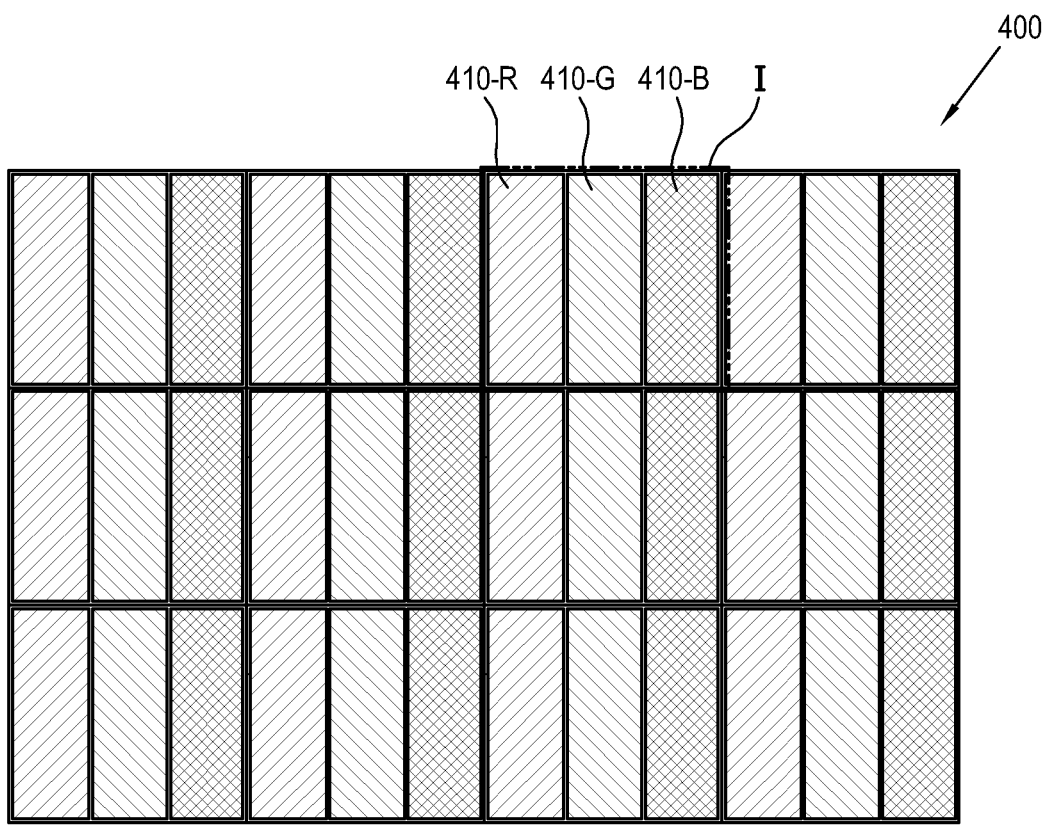
FIGS. 3A and 3B are views showing a first metal linear grid of a sub pixel.
Figure 3B:
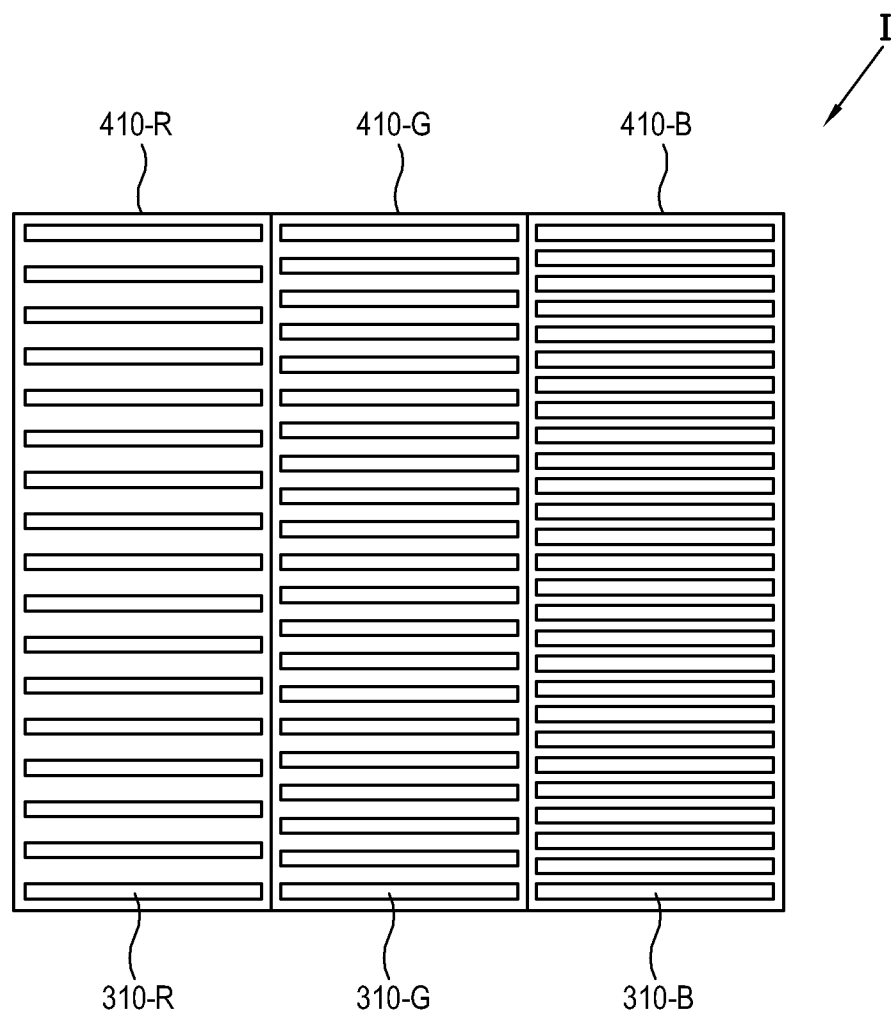
Figure 4:
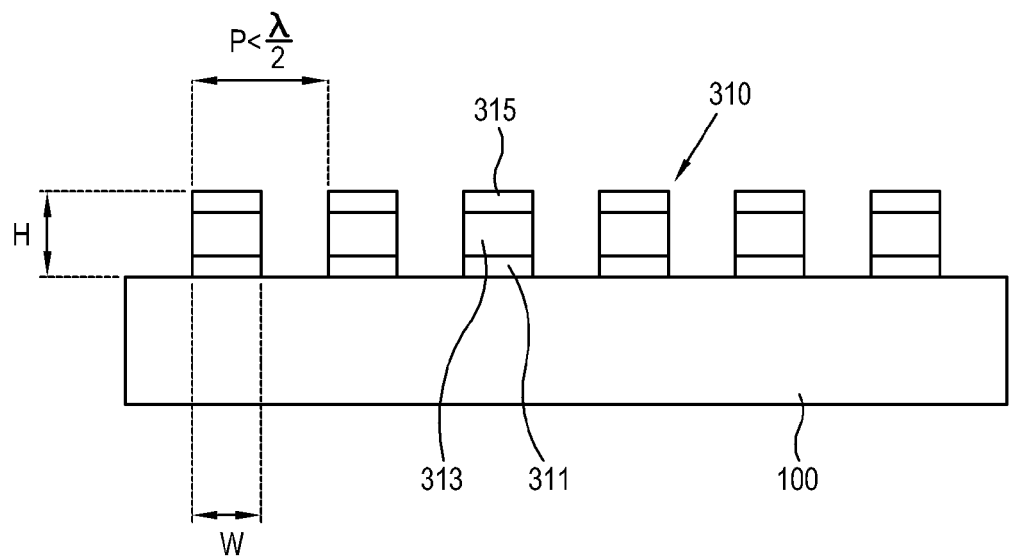
FIG. 4 is a cross-section view of the color filter layer of FIG. 2.

The color filter layer 300 is formed on the first substrate 100, and the pixel layer 400 for controlling the liquid crystal array and displaying an image is formed on the color filter layer 300. FIG. 2 is a view showing a color filter layer of FIG. 1, FIGS. 3A and 3B are views showing a first metal linear grid of a sub pixel, and FIG. 4 is a cross-section view of the color filter layer of FIG. 2. The color filter layer 300 includes the first metal linear grid 310 arranged with different pitches so that a first polarized component of the incident light can be emitted as light of different color.

As shown therein, the first metal linear grid 310 is shaped like a bar arranged in certain direction on the first substrate 100. The first metal linear grid 310 is arranged to be of a certain height (H) and width (W). The cycle, i.e., the pitch of the first metal linear grid 310 is controlled differently according to desired colors of light.

If a pitch of a diffraction grid is adjusted to be equal to or shorter than ½ of the wavelength of the light, a diffraction wave is not formed but only transmitted light and reflected light exist. As shown therein, when the incident light passes through the first metal linear grid 310 shaped like a slit, the first polarized component of the incident light, which is perpendicular to the first metal linear grid 310, is transmitted by the first substrate 100, but a second polarized component, which is parallel to the first metal linear grid 310, becomes reflected light. That is, the incident light passing through the color filter layer 300 is polarized with respect to a certain direction. Meanwhile, air may be formed in between the first metal linear grids 310.

FIG. 3A is a view showing a pixel I and sub pixels 410-R, 410-G and 410-B constituting the pixel I. In this exemplary embodiment, the pixel I includes a red sub pixel 410-R formed in a region where red light is emitted, a green sub pixel 410-G formed in a region where green light is emitted, and a blue sub pixel 410-B formed in a region where blue light is emitted. The color filter layer 300 corresponding to such a pixel layer 400 is formed with the first metal linear grid 310 having different pitches according to the sub pixels 410-R, 410-G and 410-B.

FIG. 3B is a view showing the first metal linear grid 310 corresponding to the sub pixels 410-R, 410-G and 410-B. The first metal linear grid 310 includes a red metal linear grid 310-R formed in a region corresponding to the red sub pixel 410-R, a green metal linear grid 310-G formed in a region corresponding to the green sub pixel 410-G, and a blue metal linear grid 310-B formed in a region corresponding to the blue sub pixel 410-B.

The red metal linear grid 310-R is arranged at every pitch shorter than ½ of a red light wavelength, the green metal linear grid 310-G is arranged at every pitch shorter than ½ of a green light wavelength, and the blue metal linear grid 310-B is arranged at every pitch shorter than ½ of a blue light wavelength. Thus, each pitch of the metal linear grids 310-R, 310-G and 310-B is adjusted in accordance with the sub pixels 410-R, 410-G and 410-B, so that the wavelength of the incident light can be controlled to thereby allow the sub pixels 410 to emit light of different colors, respectively.

The pitch of the red metal linear grid 310-R is shorter than ½ of the red light wavelength, i.e., about 330~390 nm, and the incident light is separated into a red light spectrum having a first polarized component while passing through the red metal linear grid 310-R. The pitch of the green metal linear grid 310-G is shorter than ½ of the green light wavelength, i.e., about 250~290 nm, and the incident light is separated into a green light spectrum having the first polarized component. The pitch of the blue metal linear grid 310-B may be set up to be shorter than ½ of the blue light wavelength, i.e., about 220~240 nm. The light passing through the blue metal linear grid 310-B is separated into a blue light spectrum having the first polarized component. In other words, the pitches of the metal linear grid 310 are decreased in order of the red metal linear grid 310-R, the green metal linear grid 310-G and the blue metal linear grid 310-B. The pitch of the first metal linear grid 310 may be adjusted in accordance with light wavelengths of color desired to be emitted from the display panel 1000, and light of yellow, cyan and magenta may be emitted instead of the foregoing light of red, green and blue.

As shown in FIG. 4, the first metal linear grid 310 in this exemplary embodiment includes a first metal layer 311, an insulating layer 313 and a second metal layer 315 stacked in sequences. The first metal layer 311 and the second metal layer 315 may be made of metal such as Al, Ag, etc. and may have a height of less than about 100 nm. In this exemplary embodiment, each of the first metal layer 311 and the second metal layer 315 may be formed to have a height of about 40 nm. The insulating layer 313 stacked between the first metal layer 311 and the second metal layer 315 may include a dielectric material such as ZnSe and $TiO_2$, and may be formed to have a height of less than about 150 nm. The height of the first metal linear grid 310 is larger than the width thereof, and a ratio of height to width may be 2~4, for example, 3. In the first metal linear grid 310, the width, the height, the pitch, the ratio of height to width, and a ratio of pitch to width may be varied depending on the material forming the first metal linear grid 310. That is, simulation about optical transmittance is conducted by taking the kind of metal, the height of dielectric material, etc. into account, and an optimal condition may be selected. Also, the width, the height, the pitch, the ratio of height to width, and a ratio of pitch to width of the first metal linear grid 310 may be varied depending on color of emitted light, i.e., each sub pixel 410.

The principle that colored light is emitted from the metal layer 311, 315 of the first metal linear grid 310 is based on Plasmon in which free electrons in metal are collectively oscillated. Nano-sized metal shows Plasmon resonance on a surface of the metal due to the oscillation of the free electrons. The surface Plasmon resonance is collective charge density oscillation of the electrons on the surface of a metal thin film, and a surface Plasmon wave caused by the surface Plasmon resonance is a surface electromagnetic wave propagating along a boundary surface between the metal and the dielectric material adjacent to the metal. As a kind of surface electromagnetic wave propagating along the boundary surface between metal and the dielectric material, the surface Plasmon wave corresponds to a wave generated when light incident to the metal surface and having a certain wavelength is not totally reflected and causes a surface wave. If the metal linear grid 310 including the first metal layer 311, the insulating layer 313 and the second metal layer 315 is arranged in the form of slits in a certain cycle, the color of emitted light is varied depending on the cycle.

According to this exemplary embodiment, the first metal linear grid 310 is configured to make white light filter into individual colors throughout a visible light region. This is to achieve a nano oscillator for quantum-Plasmon-quantum conversion within a certain oscillation wavelength, which enhances a pass bandwidth and makes compactness possible as compared with other color filtering methods. Also, the filtered light has already been naturally polarized, so that the filtered light can be directly applied to an LCD panel or the like without any separate polarizing layer.

Accordingly, the display panel 100 can generate polarized colored light through one color filter layer 300 instead of the existing polarizing film and color filter. Also, light that is not transmitted by the first substrate 100 is not absorbed either but is instead reflected from the first metal layer 311 of the first metal linear grid 310, so that this light is likely to be reflected again toward the display panel 1000. That is, the total optical efficiency is improved so that the conventional dual brightness enhance film (DBEF) can be omitted.

The pixel layer 400 includes a plurality of pixels (not shown) for changing the array of liquid crystal filled in the liquid crystal layer 500 in response to a control signal received from the exterior.

Figure 5:
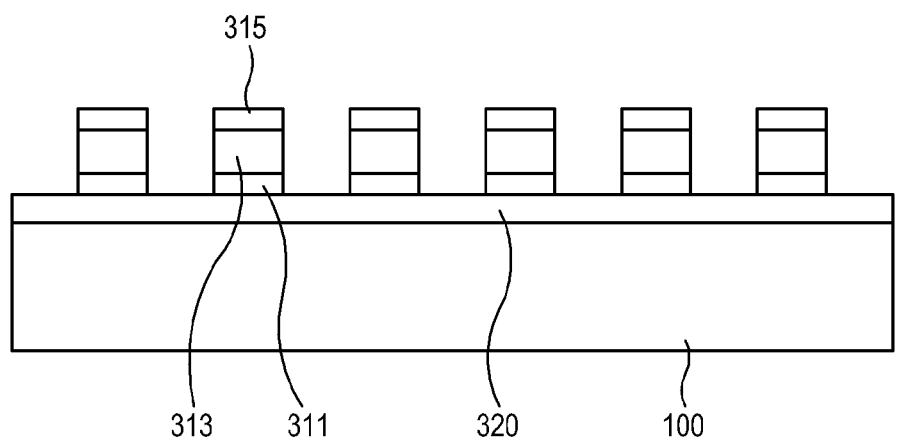
FIG. 5 is a cross-section view of another color filter layer according to an exemplary embodiment.

FIG. 5 is a cross-section view of another color filter layer according to an exemplary embodiment.

As shown therein, the color filter layer 300 may further include a dielectric layer 320 stacked under the first metal linear grid 310. The dielectric layer 320 may be made of a material similar to the first substrate 100, and may contain $MgF_2$. The dielectric layer 320 may be provided in the form of a film coupled to the first substrate 100. Here, the dielectric layer 320 may replace the first substrate 100 or may be omitted.

Figure 6:
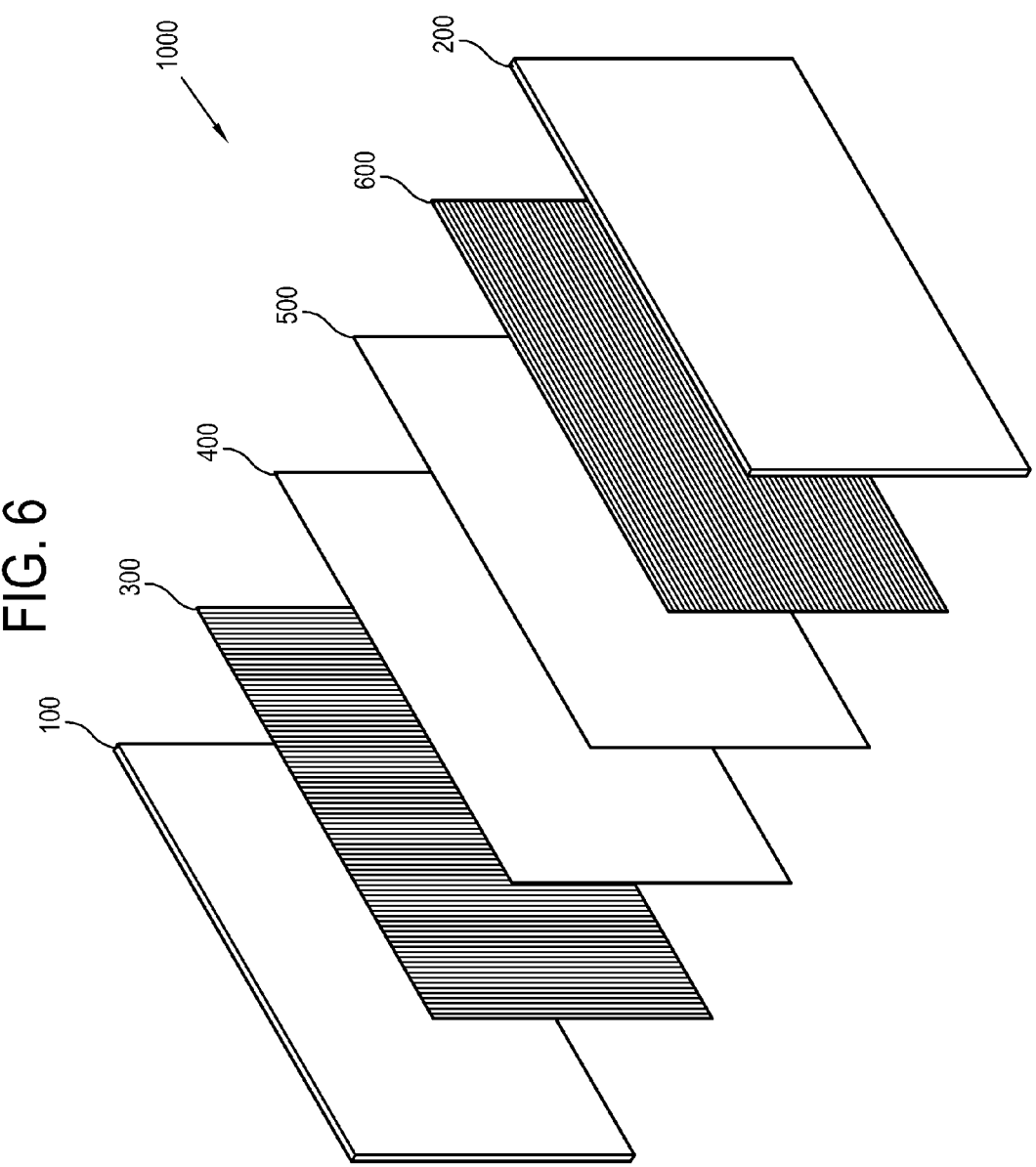
FIG. 6 is a view showing a layer structure of a display panel according to another exemplary embodiment.
Figure 7:
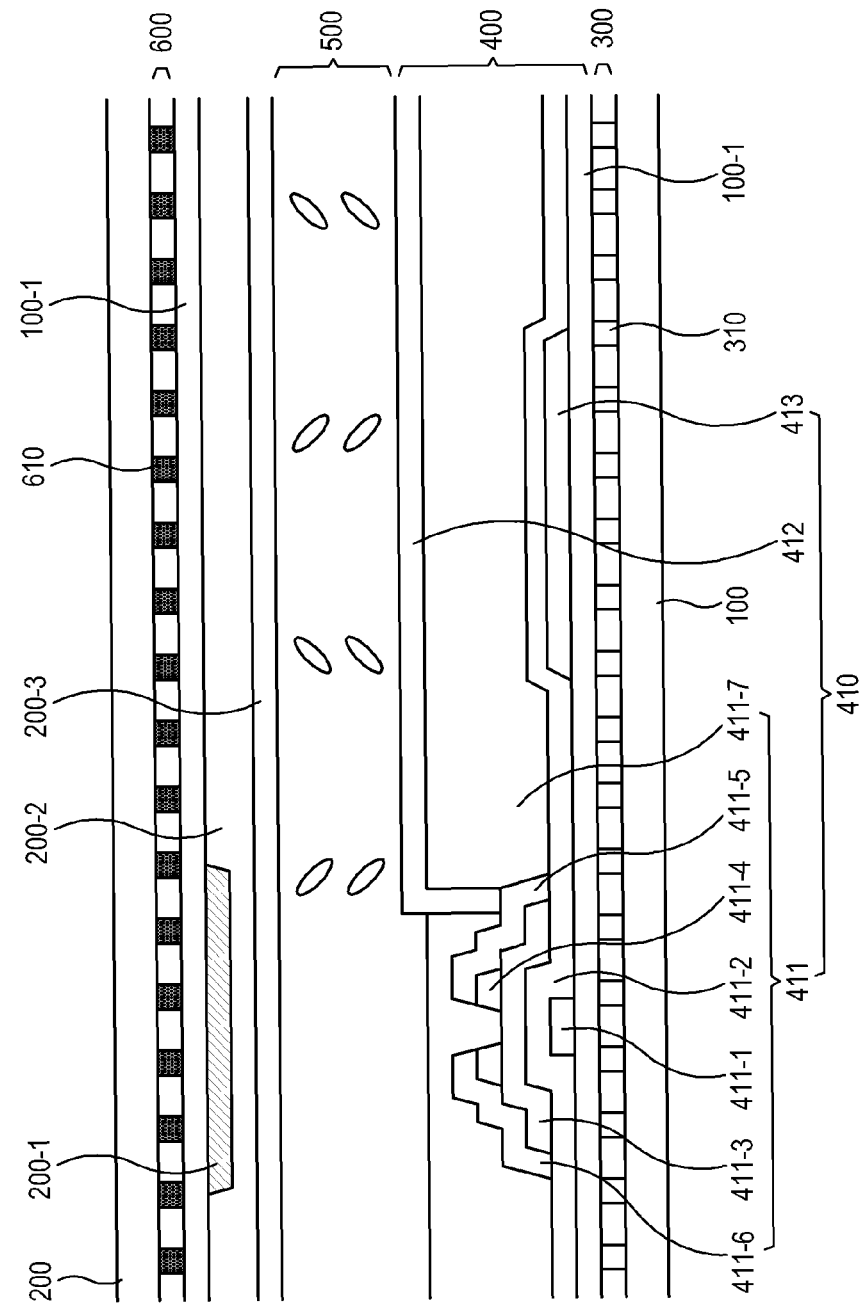
FIG. 7 is a cross-section view of the display panel of FIG. 6.

FIG. 6 is a view showing a layer structure of a display panel according to another exemplary embodiment, and FIG. 7 is a cross-section view of the display panel of FIG. 6. As shown therein, the display panel 1000 may further include a first polarizing layer 600 between the liquid crystal layer 500 and the second substrate 200. The first polarizing layer 600 may further include a second metal linear grid 610 that transmits light of a second polarized component different from the first polarized component, and changes only a polarized state of the incident light.

On the color filter layer 300, a planarization layer 100-1 for protecting and leveling the first metal linear grid 310 is formed. The pixel layer 400 formed on the planarization layer 100-1 includes a plurality of pixels (not shown) for changing the liquid crystal array filled in the liquid crystal layer 500, and each pixel includes a plurality of sub pixels 410. In this exemplary embodiment, the sub pixels 410 represent the smallest unit pixels in which video signal values corresponding to red, green and blue are input, and a unit, which includes a plurality of sub pixels 410 and expresses one video signal, is regarded as the pixel. The sub pixel 410 includes a thin film transistor (TFT) 411 as a switching device, and a pixel electrode 412. In the exemplary embodiment, the sub pixel 410 has a two-dimensional spatial concept as well as a physical concept including the TFT 411 and the pixel electrode 412.

On the planarization layer 100-1 of the first substrate 100, the gate electrode 411-1 is formed. The gate electrode 411-1 may be a single or multiple layers containing metal. On the same layer as the gate electrode 411-1, there are further formed a gate line (not shown) connected to the gate electrode and arranged in a transverse direction of the display panel 1000, and a gate pad (not shown) connected to a gate driver (not shown) and transmitting a driving signal to the gate line. Also, on the same layer as the gate electrode 411-1, a sustain electrode 413 is formed for building electric charges up.

On the first substrate 100, a gate insulating layer 411-2 containing silicon nitride (SiNx) or the like covers the gate electrode 411-1 and the sustain electrode 413.

On the gate insulating layer 411-2 of the gate electrode 411-1, a semiconductor layer 411-3 containing amorphous silicon or the like semiconductor is formed. On the semiconductor layer 411-3, an ohmic contact layer 411-4 containing n+ hydrogenated amorphous silicon or the like material highly doped with silicide or n-type impurities is formed. Further, the ohmic contact layer 411-4 is removed in a channel portion between a source electrode 411-5 and a drain electrode 411-6 to be described later.

On the ohmic contact layer 411-4 and the gate insulating layer 411-2, data wiring lines 411-5 and 411-6 are formed. The data wiring lines 411-5 and 411-6 may also be a single or multiple layers containing metal. The data wiring lines 411-5 and 411-6 includes a data line (not shown) formed in a vertical direction and intersecting a gate line (not shown) to form the sub pixel 410, a source electrode 411-5 branched from the data line and extended to an upper portion of the ohmic contact layer 411-4, and a drain electrode 411-6 separated from the source electrode 411-5 and formed on an upper portion of the ohmic contact layer 411-4 opposite to the source electrode 411-5.

On the gate insulating layer 411-2 and the semiconductor layer 411-3 that is not covered with the data wiring lines 411-5 and 411-6, a passivation layer 411-7 is formed. At this time, silicon nitride or the like inorganic insulting film may be further formed between the passivation layer 411-7 and the TFT 411, thereby securing the reliability of the TFT 411.

Typically, the pixel electrode 412 formed on the passivation layer 411-7 contains indium tin oxide (ITO) or indium zinc oxide (IZO), or the like transparent conductive material. The pixel electrode 412 is electrically connected to the source electrode 411-5.

As shown in FIG. 7, the second substrate 200 is formed with the first polarizing layer 600, and a black matrix 200-1 in a region corresponding to the TFT 411 of the first substrate 100, and a common electrode 200-3 generating a voltage corresponding to the pixel electrode 412.

Figure 8:
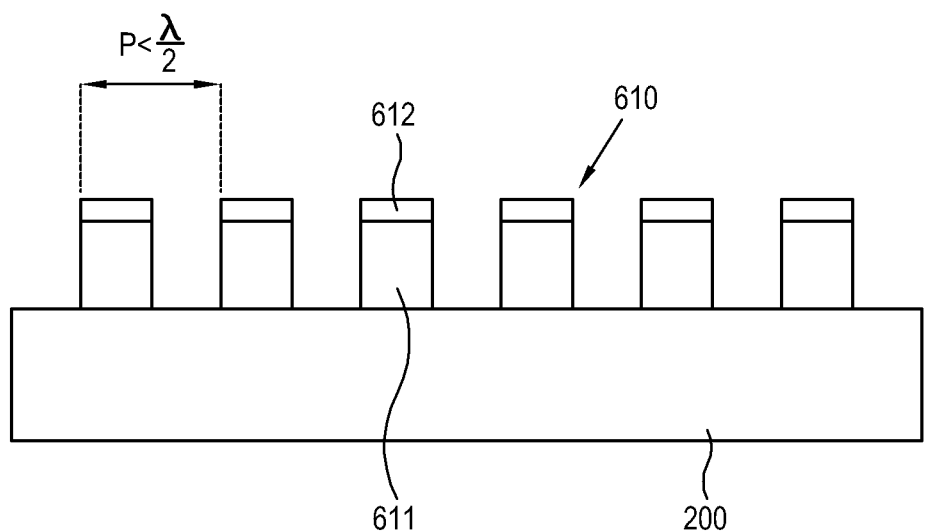
FIG. 8 is a cross-section view of a polarizing layer on a second substrate of FIG. 7.

FIG. 8 is a cross-section view of the first polarizing layer 600. As shown in FIG. 8, the first polarizing layer 600 includes the second metal linear grid 610 shaped like a bar arranged in a direction perpendicular to the first metal linear grid 310. That is, the second metal linear grid 610 transmits a second polarized component perpendicular to the first polarized component. The second metal linear grid 610 has a pitch capable of transmitting incident light of all wavelengths since it has only to transmit the second polarized component. Particularly, the pitch of the second metal linear grid 610 may be formed to be shorter than ½ of a blue light wavelength. In this exemplary embodiment, the second metal linear grid 610 has a height of about 150 nm and a pitch of 100 to 150 nm. Also, a ratio of height to width of the second metal linear grid 610 may be adjusted within a range from 2 to 4.

The second metal linear grid 610 includes a metal layer 611 and a hard mask 612 formed on the metal layer 611. The metal layer 611 may contain the same metal as or different metal from that of the first metal linear grid 310. In other words, the metal layer 611 may contain metal such as Al, Ag, Cu, etc., or may contain MoW or the like hard alloy. Alternatively, the metal layer 611 may be made of a conductive polymer or may contain the conductive polymer. The hard mask 612 serves to protect the metal layer 611 and improve polarizing performance of the metal layer 611, and may contain a dielectric material such as $SiO_2$.

According to another exemplary embodiment, the first metal linear grid 310 and the second metal linear grid 610 may have the same polarizing direction. Since it can be set up that light can be blocked out or transmitted in accordance with whether a voltage is applied or not by adjusting the state of the liquid crystal depending on an orientation, there is no need for making the polarizing directions of the first metal linear grid 310 and the second metal linear grid 610 be perpendicular to each other. This may be adjusted in accordance with the orientation of the liquid crystal.

The planarization layer 100-1 is formed on the first metal linear grid 310 so as to protect and level the first metal linear grid 310.

On the planarization layer 100-1, the black matrix 200-1 is formed in a region corresponding to the TFT 411 of the first substrate 100. Generally, the black matrix 200-1 serves to divide the sub pixels 410 and prevent the TFT 411 from being exposed to external light. The black matrix 200-1 contains a photosensitive organic material with black dye. As the black dye, carbon black, titanium oxide or the like is used.

On the black matrix 200-1, an overcoat layer 200-2 is formed for leveling and protecting the black matrix 200-1. As the overcoat layer 200-2, an acrylic epoxy material is typically used.

On the overcoat layer 200-2, a common electrode 200-3 is formed. The common electrode 200-3 is made of a transparent conductive material such as indium tin oxide (ITO), indium zinc oxide (IZO), etc. The common electrode 200-3, together with the pixel electrode 412 of the first substrate 100, directly applies voltage to the liquid crystal layer 500.

Figure 9:
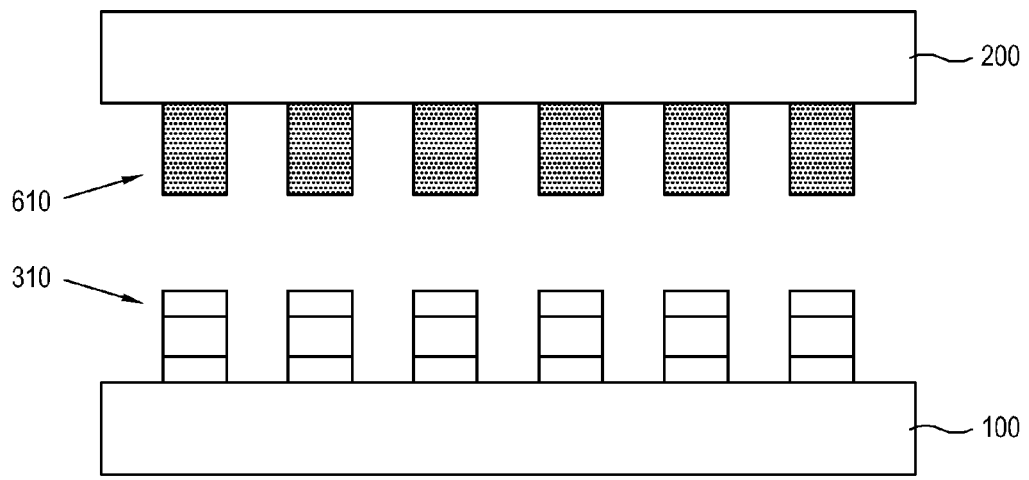
FIGS. 9 to 11 are views showing a color filter layer and a polarizing layer of a display panel according to another exemplary embodiment.
Figure 10:
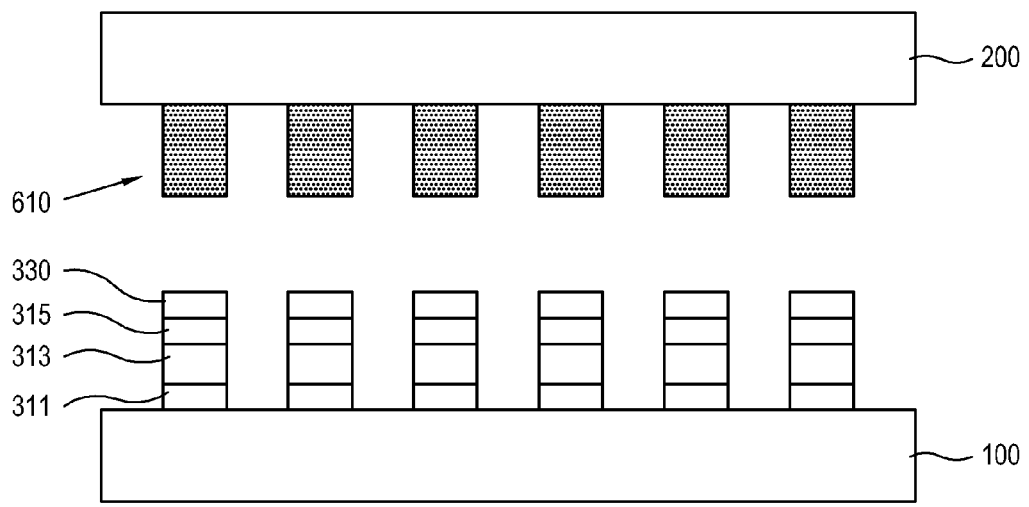
Figure 11:
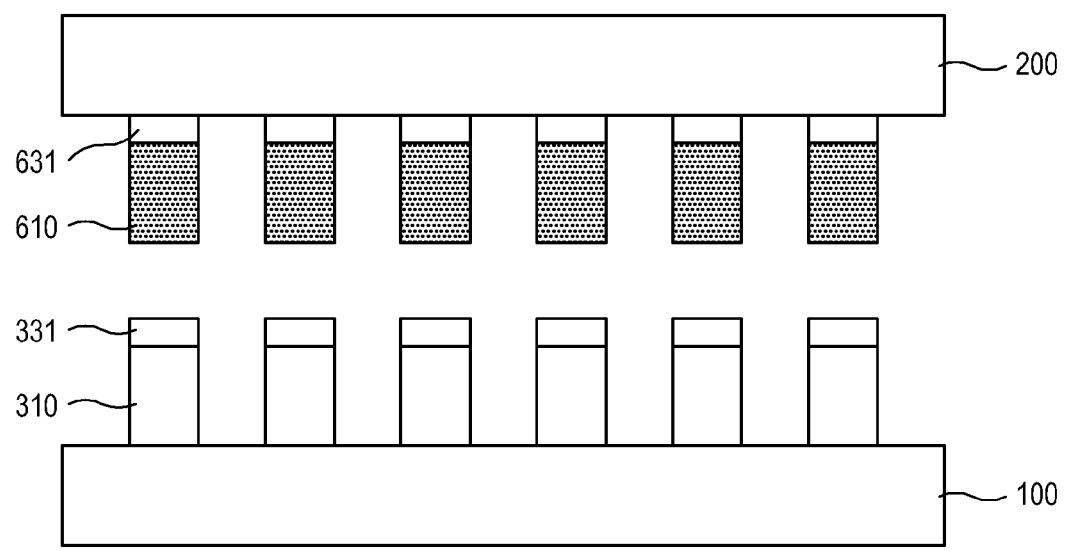

FIGS. 9 to 11 are views showing a color filter layer and a polarizing layer of a display panel according to another exemplary embodiment. The display panel 1000 of FIGS. 9 to 11 includes the first metal linear grid 310 and the second metal linear grid 610 different from the first metal linear grid 310 in material, particularly, in metal material contained therein. The metal contained in the first metal linear grid 310 and the second metal linear grid 610 may be different from each other in reflectivity and hardness.

The display panel 1000 of FIG. 9 includes the first metal linear grid 310 containing metal of high reflectivity, and a second metal linear grid 610 containing metal of low reflectivity. If light enters through the bottom of the first substrate 100 and exits through the second substrate 200, the light of only the first polarized component enters the liquid crystal layer 500, and the light of the second polarized component is reflected from the first substrate 100. Typically, a backlight assembly (not shown) emitting light under the display panel 1000 includes a reflective plate that reflects light reflected from the first substrate 100 toward the display panel 1000 again. Metal contained in the first metal linear grid 310 may have high reflectivity so that much more light can be recycled by the reflective plate and enter the first substrate 100, i.e., more much light of the second polarized component can enter the reflective plate. For example, the first metal linear grid 310 may include metal having high reflectivity, such as Al, Ag, Cu, etc. Thus, if the highly-reflective metal causes the reflectivity of the first metal linear grid 310, it is possible to omit the dual brightness enhance film (DBEF) used in the conventional display panel. Accordingly, there is an effect on reducing production costs of the display panel 1000, and it is possible to make the display apparatus including the display panel 1000 thin and lightweight.

The second metal linear grid 610 may contain metal having low reflectivity so as to suppress reflection of external light and absorb the light. The second metal linear grid 610 may undergo additional processes for decreasing the reflectivity of the metal, or may include or be configured with carbon, chrome oxide, etc. for absorbing the light.

In the meantime, the second metal linear grid 610 according to another exemplary embodiment may include metal having high strength in consideration of numerous contacts with the exterior. For example, the second metal linear grid 610 may contain MoW or the like alloy, or may contain a conductive polymer capable of performing substantially the same function as the metal layer.

A display panel 1000 of FIG. 10 may further include a light absorbing layer 330 formed on the first metal linear grid 310 included in the first substrate 100 and absorbing light. If external light enters the display panel 1000 and is reflected again, there are problems that a contrast ratio of the display panel 1000 may be lowered and picture quality may be deteriorated due to the reflection of light. To prevent these problems, the first substrate 100 according to this exemplary embodiment includes the light absorbing layer 330 on the first metal linear grid 310 in order to absorb undesired external light.

The light absorbing layer 330 may contain metal having low reflectivity, and or may include or be configured with carbon, chrome oxide, etc. for absorbing the light.

Alternatively, the light absorbing layer 330 may be formed not on the first substrate but beneath the second metal linear grid 610 of the second substrate 200. That is, the external light is intercepted by the light absorbing layer formed beneath the second metal linear grid 610 and prevented from entering the display panel 1000.

FIG. 11 shows a first light absorbing layer 331 formed on the first substrate 100 and a second light absorbing layer 631 formed on the second substrate 200. To reduce the problems not associated with the light emitted from the backlight assembly (not shown) but instead of the reflection of the external light, the display panel 1000 according to this exemplary embodiment includes the light absorbing layers 331 and 631 on both the first and second substrates 100 and 200. The light absorbing layers 331 and 631 may be configured with carbon, chrome oxide, etc., but are not limited thereto as long as the light absorbing layers 331 and 631 include a material capable of absorbing the light.

The first light absorbing layer 331 and the second light absorbing layer 631 may be formed on either of the substrates as shown in FIG. 10, or may be omitted altogether.

FIG. 12 is a view showing a layer structure of a display panel according to still another exemplary embodiment, and FIG. 13 is a cross-section of the display panel of FIG. 12.

As shown therein, the display panel 1000 according to this exemplary embodiment may further include a second polarizing layer 700 provided beneath the color filter layer 300 and transmitting the first polarized component. The second polarizing layer 700 may include a third metal linear grid 710 made of substantially the same metal as the second metal linear grid 610 of the first metal linear grid 310 or the second metal linear grid 610, and oriented in the same direction as the first metal linear grid 310. The third metal linear grid 710 is oriented in the same direction as the first metal linear grid 310, and thus transmits the first polarized component. The light of the first polarized component passed through the second polarizing layer 700 is emitted with red, blue and green colors while passing through the color filter layer 300.

The metal layer contained in the third metal linear grid 710 may contain highly-reflective metal, e.g., at least one of Al, Ag and Cu. Further, a light absorbing layer may further be provided on the metal layer and absorb external light.

FIGS. 14A to 14F are views for explaining a manufacturing method for a first substrate of a display panel according to still another exemplary embodiment.

Figure 14A:
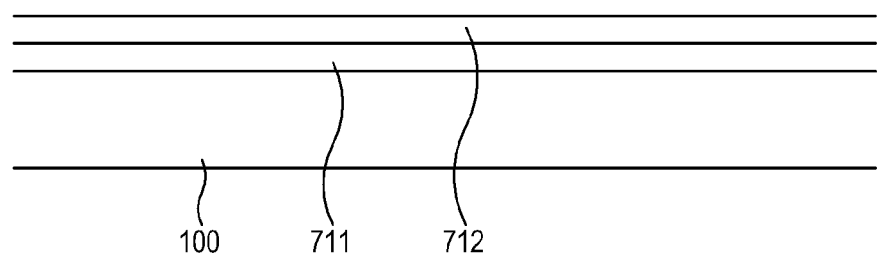
FIGS. 14A to 14F are views for explaining a manufacturing method for a first substrate of a display panel according to still another exemplary embodiment.
Figure 14B:
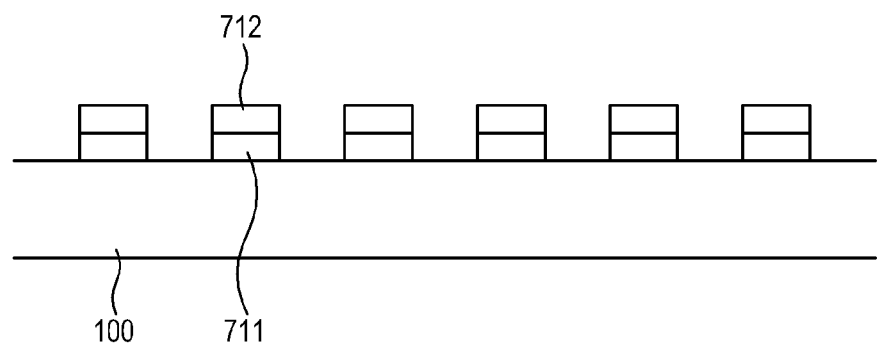

As shown in FIG. 14A, a metal layer 711 and a hard mask 712 for protecting the metal layer 711 are stacked on the first substrate 100 to form the second polarizing layer 700.

Then, a general patterning process is performed. In other words, photoresist is deposited, exposed to light through a mask, and developed and etched to thereby form the third metal linear grid 710 (refer to FIG. 14B).

Figure 14C:
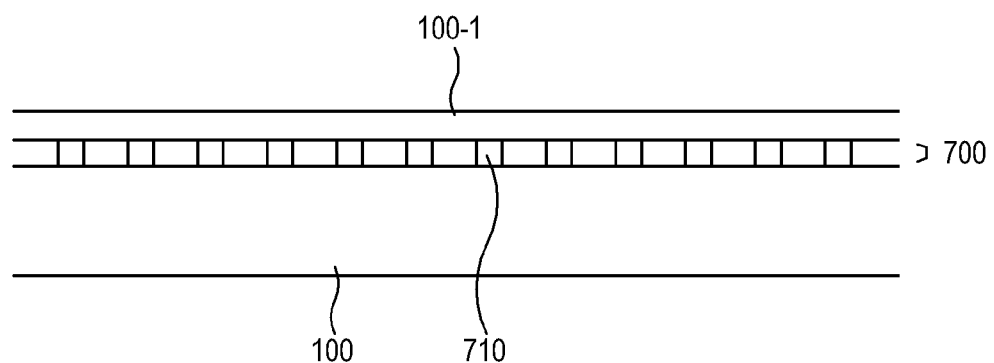

Then, as shown in FIG. 14C, the planarization layer 100-1 is formed on the second polarizing layer 700. The planarization layer 100-1 may contain silicon nitride SiNx.

Figure 14D:
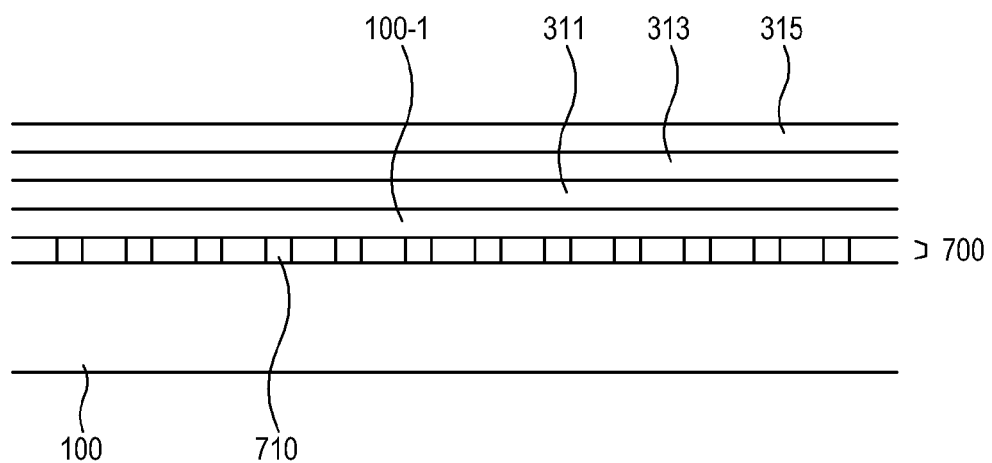

As shown in FIG. 14D, the first metal layer 311, the insulating layer 313 and the second metal layer 315 are stacked in sequence by a sputtering method or the like in order to form a color filter polarizing layer 300 on the planarization layer 100-1.

Figure 14E:
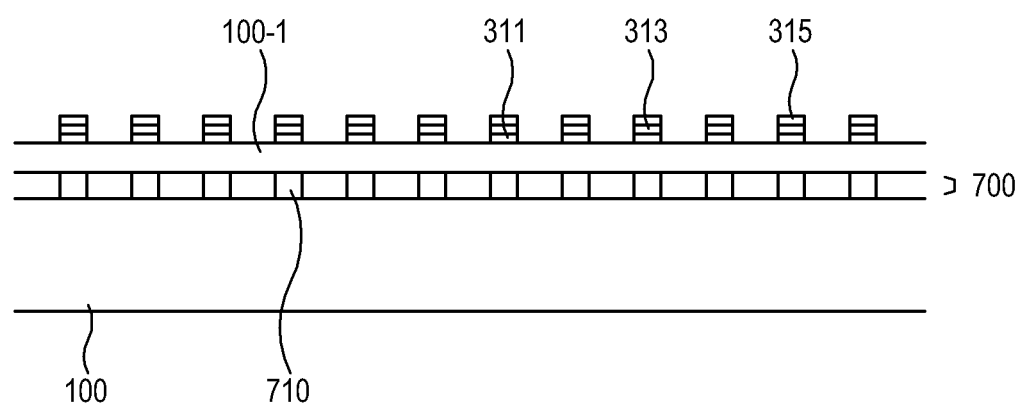

As shown in FIG. 14E, the first metal linear grid 310 (311, 313 and 315) is formed by performing a photolithography or etching process once.

Figure 14F:
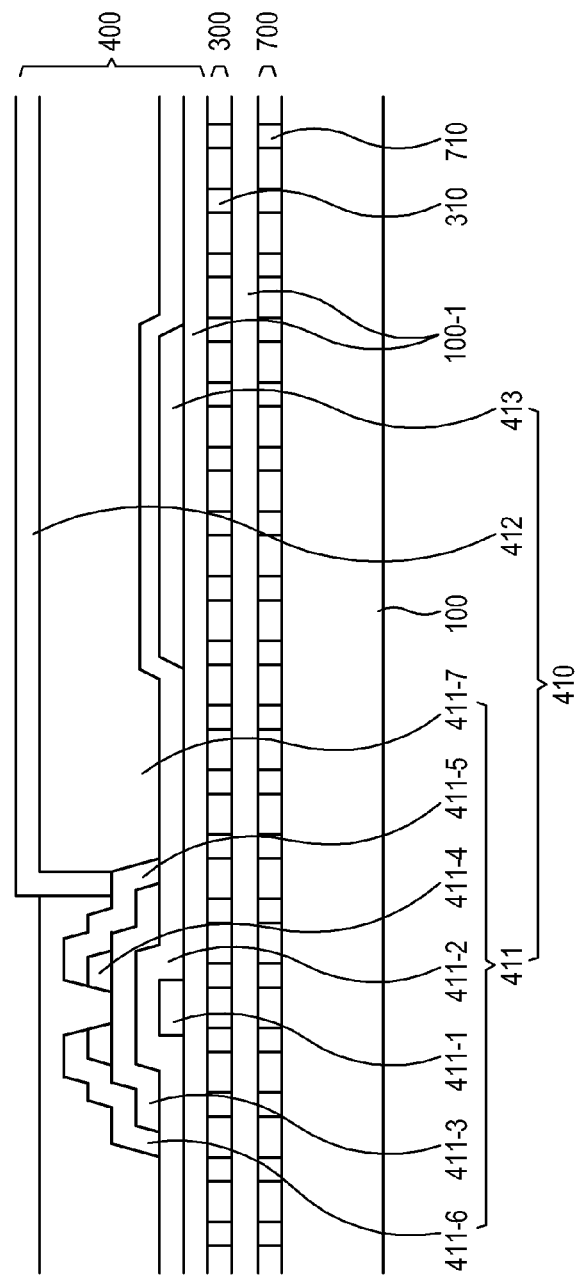

Then, as shown in FIG. 14F, the planarization layer 100-1 is formed for protecting and leveling the surface of the first metal linear grid 310, and the TFT 411 and the pixel electrode 412 electrically connected to the TFT 411 are formed on the planarization layer 412. The pixel electrode 412 may be formed by depositing metal by the sputtering method and patterning it.

FIG. 15A to 15D are views for explaining a manufacturing method for a second substrate of a display panel according to still another exemplary embodiment.

Figure 15A:
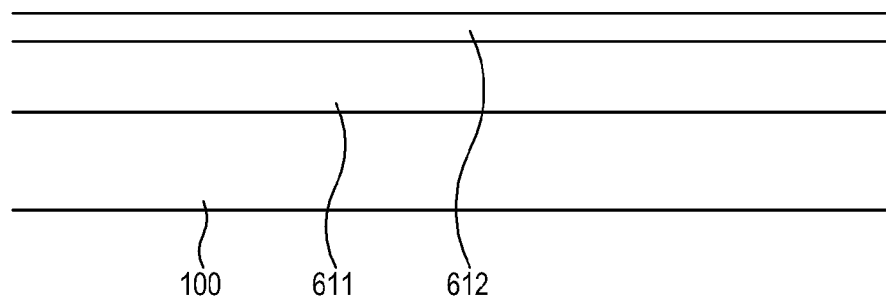
FIG. 15A to 15D are views for explaining a manufacturing method for a second substrate of a display panel according to still another exemplary embodiment.

The first polarizing layer 600 of the second substrate 200 may be formed by a method similar to that for the color filter polarizing layer 300 of the first substrate 100. That is, as shown in FIG. 15A, the metal layer 611 and the hard mask 612 for protecting the metal layer 611 are stacked on the second substrate 200.

Figure 15B:
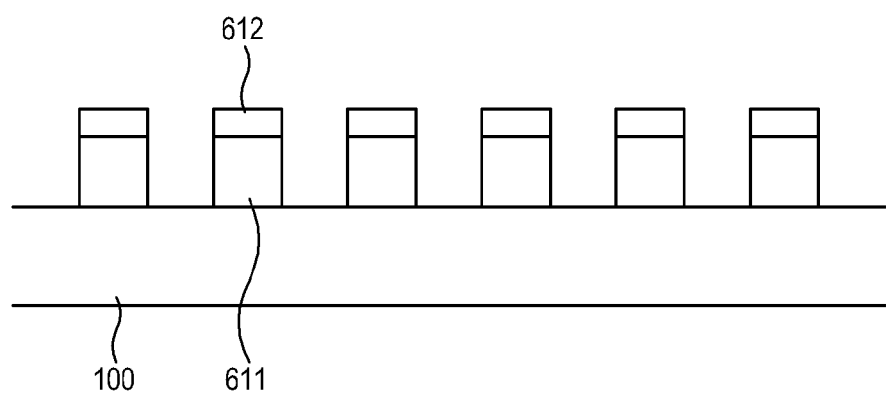

Then, the second metal linear grid 610 is formed by performing a photolithography or etching process once (refer to FIG. 15B).

Figure 15C:
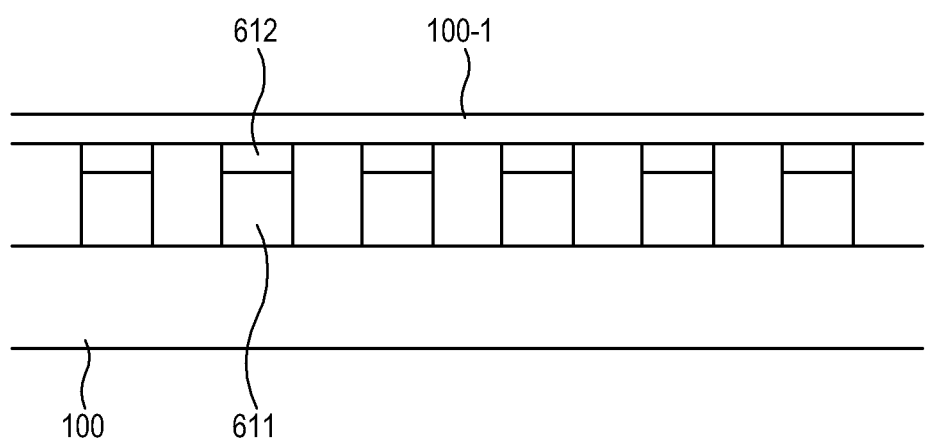

After forming the second metal linear grid 610, as shown in FIG. 15C, the planarization layer 100-1 for protecting and leveling the surface of the second metal linear grid 610 is formed.

Figure 15D:
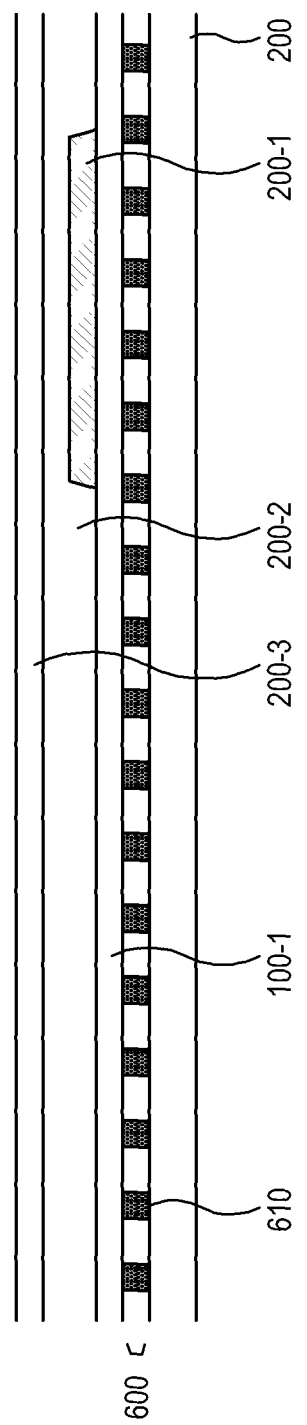

As shown in FIG. 15D, the black matrix 200-1 is formed on the planarization layer 100-1 in a region corresponding to the TFT 411, and the overcoat layer 200-2 is formed for leveling the black matrix 200-1. Further, the common electrode 200-3 containing a transparent conductive material is formed by a sputtering method.

The two substrates 100 and 200 of FIGS. 15D and 14F are coupled and encapsulated with each other, and the liquid crystal is inserted therein, thereby completing the display panel 1000.

Figure 16:
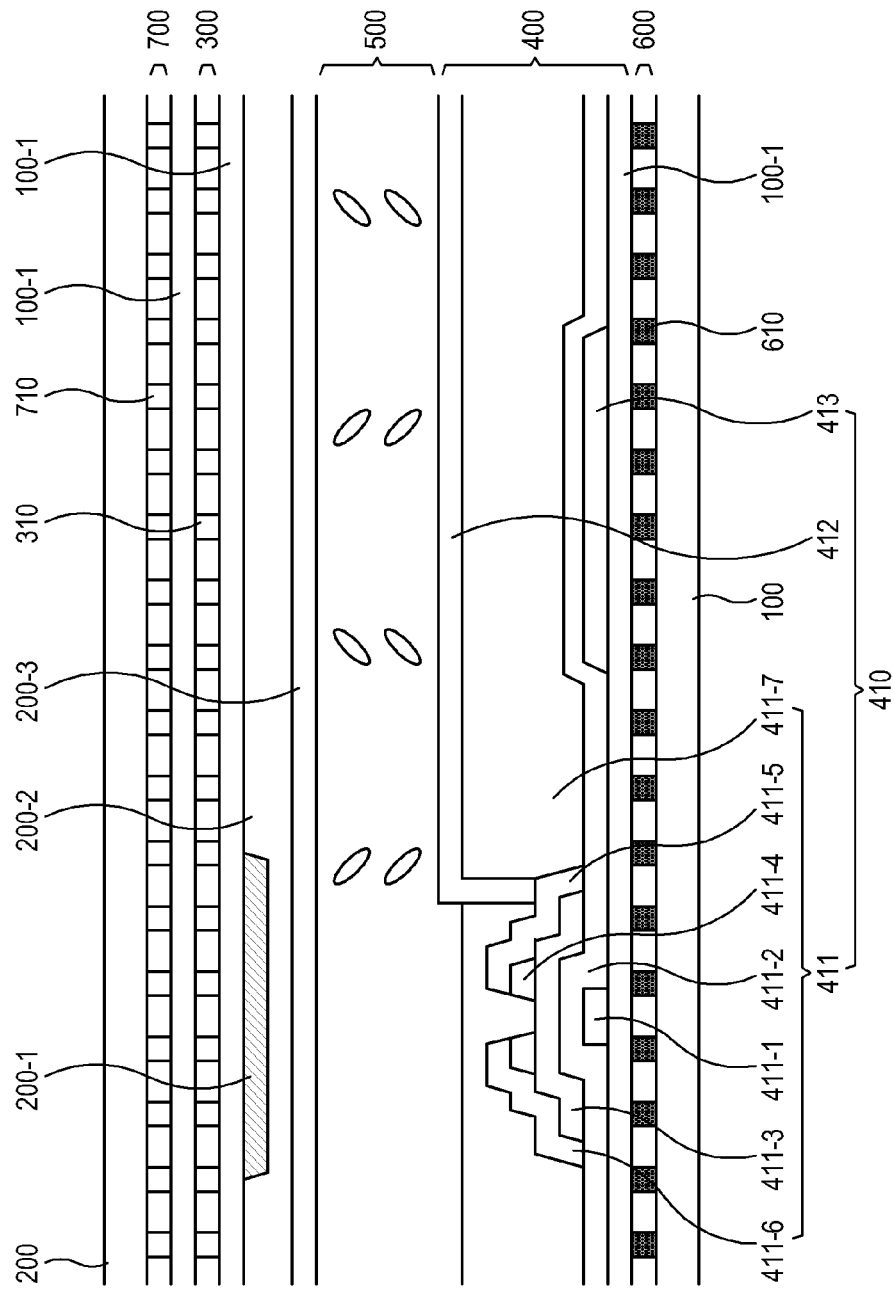
FIG. 16 is a cross-section view of a display panel according to still another exemplary embodiment.

FIG. 16 is a cross-section view of a display panel according to still another exemplary embodiment.

As shown therein, the display panel 1000 according to this exemplary embodiment includes a first polarizing layer 600 formed on the first substrate 100, and a color filter layer 300 and a second polarizing layer 700 formed on the second substrate 200. In other words, the color filter layer 300 and the second polarizing layer 700 may be arranged on not the pixel layer 400 but on the substrate formed with the black matrix 200-1. If light enters through the bottom of the first substrate 100, the light of second polarized component passed through the first polarizing layer 600 passes through the liquid crystal layer 500, and then emits as the light of the first polarized component with different colors while passing through the color filter layer 300 and the second polarizing layer 700. Each of the color filter layer 300 and the first polarizing layer 600 may be selectively formed on the same or different substrates as the pixel electrode 412. Of course, light may enter though the second substrate 200 and exit through the first substrate 100.

The display panel 1000 according to an alternative exemplary embodiment may include a reflection constraining layer (not shown) arranged on either of the first substrate 100 or the second substrate 200, i.e., an outer surface of the substrate through which light is substantially emitted. The display panel 1000, which is a transmission-type panel where image is displayed with only the incident light and light is fully transmitted, may further include the reflection-constraining layer to decrease surface reflection due to external light. Further, the reflection constraining layer may include an anti-reflection film or an anti-glare film, or may include a moth-eye pattern layer formed by nano technology on the outer surface of the second substrate 200. Also, the reflection-constraining layer may be formed by treatment such as low reflection (LR), anti-reflection (AR), hardcoating (HC), etc. or by combination of the above treatment. Such surface treatment may perform resolution enhancement, anti-discharge, anti-pollution, abrasion-resistance, etc. as well as the antireflection. Sometimes, the reflection-constraining layer may be added to the substrate for the incident light, or in the middle of the display panel 1000.

The display panel 1000 may further include a printed circuit board mounted with a gate driving integrated chip (IC) and a data chip film package although they are not shown. Also, a compensation film (not shown) may be further provided outside the first substrate 100 and the second substrate 200.

Figure 17:
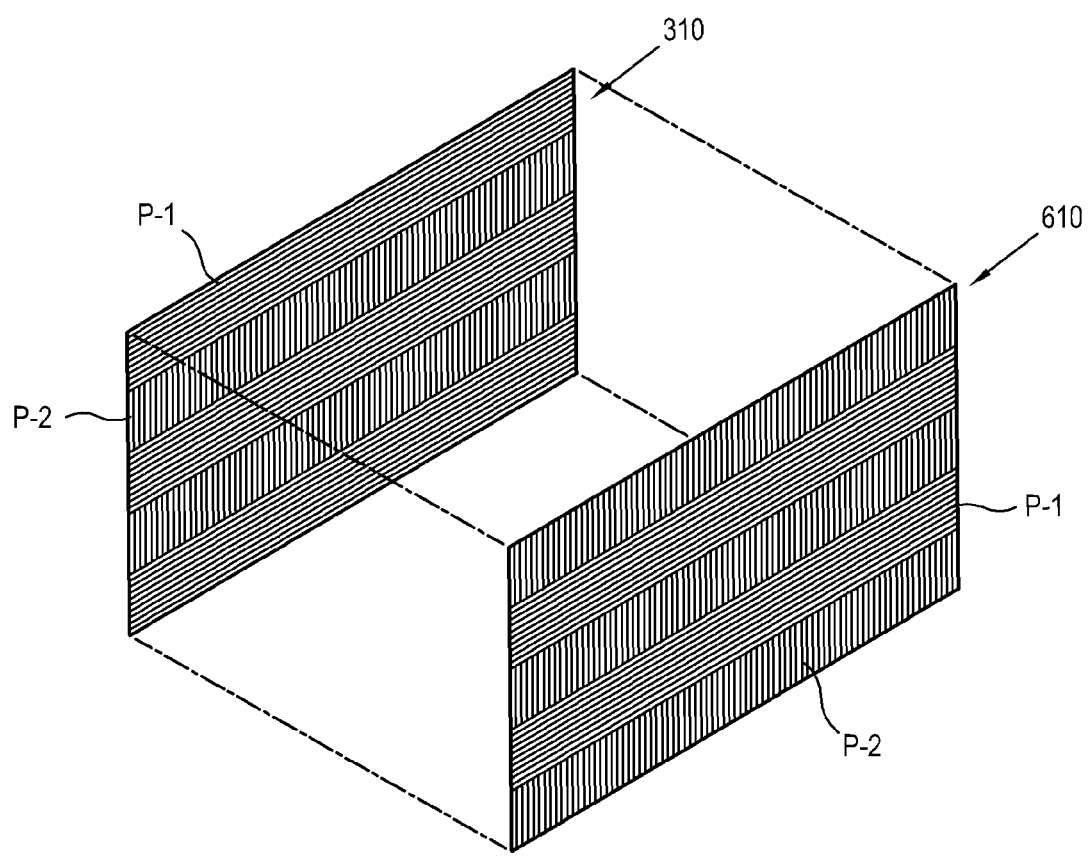
FIG. 17 is a view for explaining polarization of first and second metal linear grids of the display panel according to an exemplary embodiment.

FIG. 17 is a view for explaining polarization of first and second metal linear grids of the display panel according to an exemplary embodiment. The line shown in FIG. 17 schematically illustrates orientation of the first metal linear grid 310 formed on the color filter layer 300 and the second metal linear grid 610 formed on the first polarizing layer 600. In accordance with the orientation, the polarized components of the transmitted light are different. For example, if a horizontal line transmits the first polarized component of the light, a vertical line transmits the second polarized component. The display panel 1000 according to this exemplary embodiment is useful in a display apparatus that displays a three-dimensional (3D) image, particularly, to a display apparatus that displays a 3D image in a passive mode. In the case of displaying the 3D image by the passive mode, a user can view an image through polarization glasses having different polarized states.

As shown therein, the color filter layer 300 is divided by a plurality of rows, and the first metal linear grid 310 includes a first polarizing linear grid P-1 for transmitting the first polarized component and a second polarizing linear grid P-2 for transmitting the second polarized component. The first polarizing linear grid P-1 is formed in odd-numbered rows and the second polarizing linear grid P-2 is formed in even-numbered rows, which are alternate to each other. Likewise, the second metal linear grid 610 includes the first polarizing linear grid P-1 for transmitting the first polarized component and the second polarizing linear grid P-2 for transmitting the second polarized component. However, contrary to the first metal linear grid 310, the first polarizing linear grid P-1 of the second metal linear grid 610 is formed in even-numbered rows and the second polarizing linear grid P-2 is formed in odd-numbered rows, which alternate to each other.

In other words, the first polarizing linear grid P-1 of the second metal linear grid 610 is formed corresponding to the second polarizing linear grid P-2 of the first metal linear grid 310, and the second polarizing linear grid P-2 of the second metal linear grid 610 is formed corresponding to the first polarizing linear grid P-1 of the first metal linear grid 310, which alternate to each other.

If a video signal corresponding to a left-eye image and a video signal corresponding to a right-eye image are alternately applied to the odd-numbered rows and the even-numbered rows, respectively, the left-eye image is displayed on the display panel 1000 through the first polarizing linear grid P-1 of the first metal linear grid 310 and the second polarizing linear grid P-2 of the second metal linear grid 610, and the right-eye image is displayed on the display panel 1000 through the second polarizing linear grid P-2 of the first metal linear grid 310 and the first polarizing linear grid P-1 of the second metal linear grid 610. Although the left-eye image and the right-eye image are simultaneously displayed on the display panel 1000, a user's two eyes respectively view different images through the polarization glasses that can transmit only one polarized component of the left-eye and right-eye images, thereby viewing the 3D image.

The repeated cycle of the first polarizing linear grid P-1 and the second polarizing linear grid P-2 may be based on one pixel row or a plurality of pixel rows.

Alternatively, the color filter layer 300 may be divided by a plurality of columns, and the first polarizing linear grid P-1 and the second polarizing linear grid P-2 may be alternately formed at every column.

Figure 18:
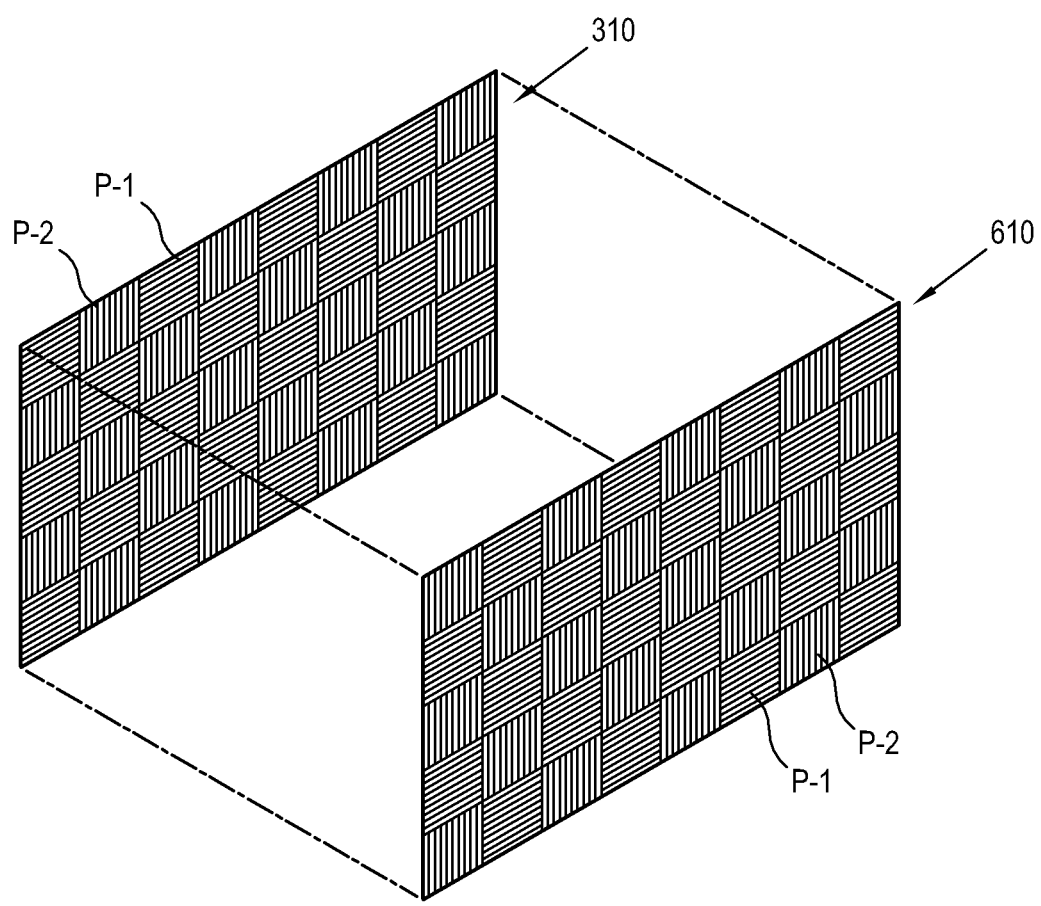
FIG. 18 is a view for explaining polarization of first and second metal linear grids of the display panel according to another exemplary embodiment.

FIG. 18 is a view for explaining polarization of first and second metal linear grids of the display panel according to another exemplary embodiment.

As shown therein, the color filter layer 300 in this exemplary embodiment is divided in the form of a checkerboard, and the first polarizing linear grid P-1 and the second polarizing linear grid P-2 are alternately formed in adjacent cells on the checkerboard. Of course, the first polarizing linear grid P-1 of the first metal linear grid 310 corresponds to the second polarizing linear grid P-2 of the second metal linear grid 610, and the second polarizing linear grid P-2 of the first metal linear grid 310 corresponds to the first polarizing linear grid P-1 of the second metal linear grid 610.

In this case, the left-eye image and the right-eye image may be alternately displayed in the adjacent cells of the checkerboard, and a user can view the 3D image through the same polarization glasses as those of the foregoing exemplary embodiment. In this exemplary embodiment, an image having resolution substantially lower than that of the display panel 1000 is displayed, but the left-eye image and the right-eye image are repeated in a grid pattern so that a user cannot sense decrease in the resolution. That is, a user can view an image having higher resolution than that of the exemplary embodiment shown in FIG. 17.

The cells of the checkerboard may correspond to individual pixels of the pixel layer 400, and may correspond to a plurality of pixels.

Further, the display panel 1000 of FIGS. 17 and 18 may externally include a polarizer for changing linearly polarized light transmitted through the first polarizing layer 600 into circularly polarized light. To secure a viewing angle and enable a user to view a 3D image even though a user views in the image from any direction, the display panel 1000 may emit the circularly polarized light.

Figure 19:
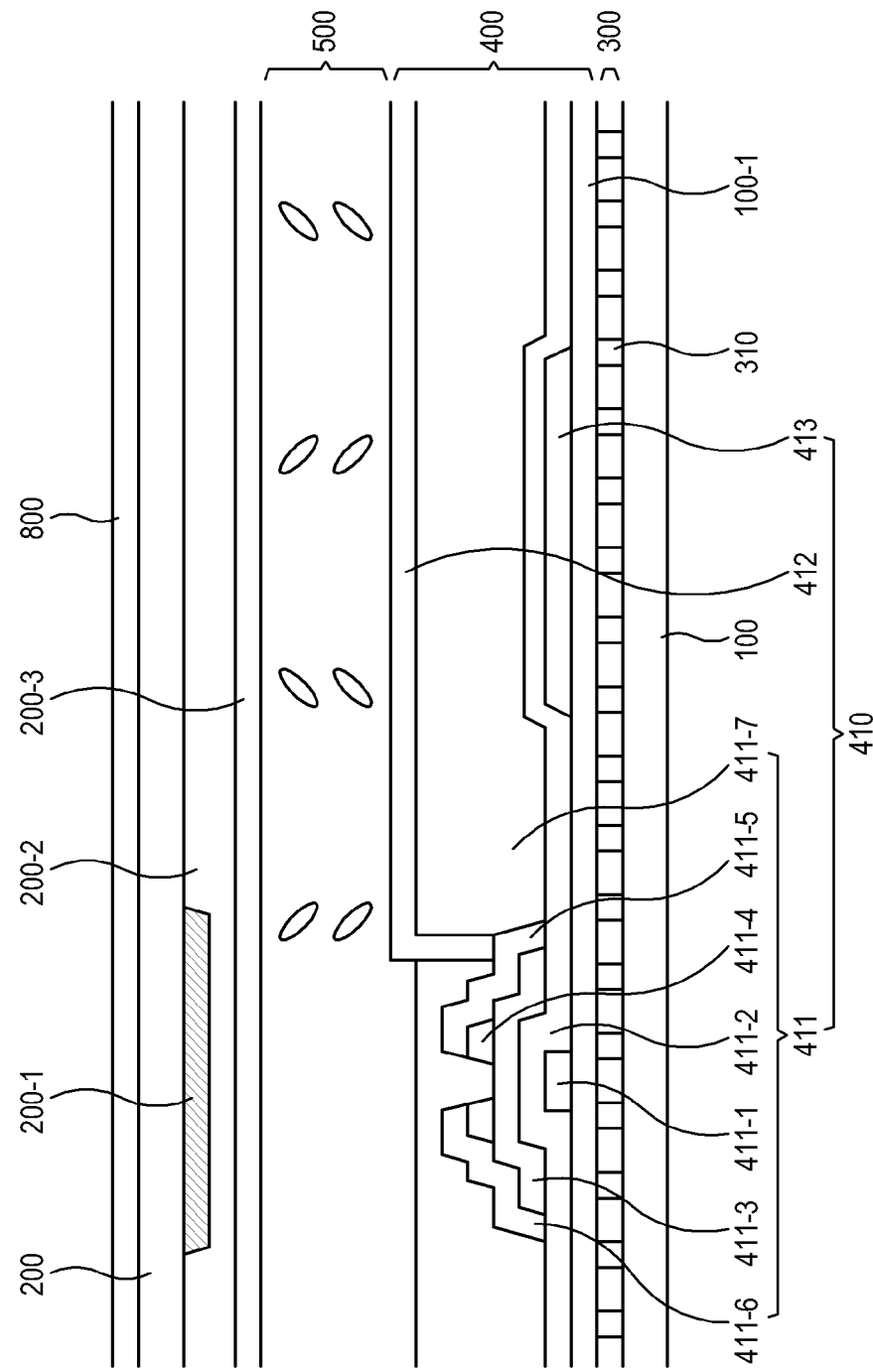
FIG. 19 is a cross-section view of a display panel according to still another exemplary embodiment.

FIG. 19 is a cross-section view of a display panel according to still another exemplary embodiment.

As shown therein, the display panel 1000 according to this exemplary embodiment includes a polarizing film 800 provided outside the second substrate 200 so as to polarize the incident light. The polarizing film 800 transmits the second polarized component different from the first polarizing component, and is in a polarization state perpendicular to that of the color filter layer 300.

The polarizing film 800 includes a polarizing device for controlling polarization characteristics by dyeing poly vinyl alcohol with iodine or dye, an isotropic film of triacetyl cellulose (TAC) placed at opposite sides of the polarizing device and protecting the polarizing device, and an adhesive to be attached to the second substrate 200. Further, a release film for protecting the adhesive and a polyethylene terephthalate (PET) protection film for protecting the surface of the polarizing film are attached, thereby forming a basic structure of the polarizing film.

The TAC surface undergoes surface treatment to have a function of anti-reflection or scratch-resistance. That is, the display panel 1000 in this exemplary embodiment includes the color filter layer 300 having the first metal linear grid 310 on the first substrate 100, and the polarizing film 800 on the second substrate 200.

Figure 20:
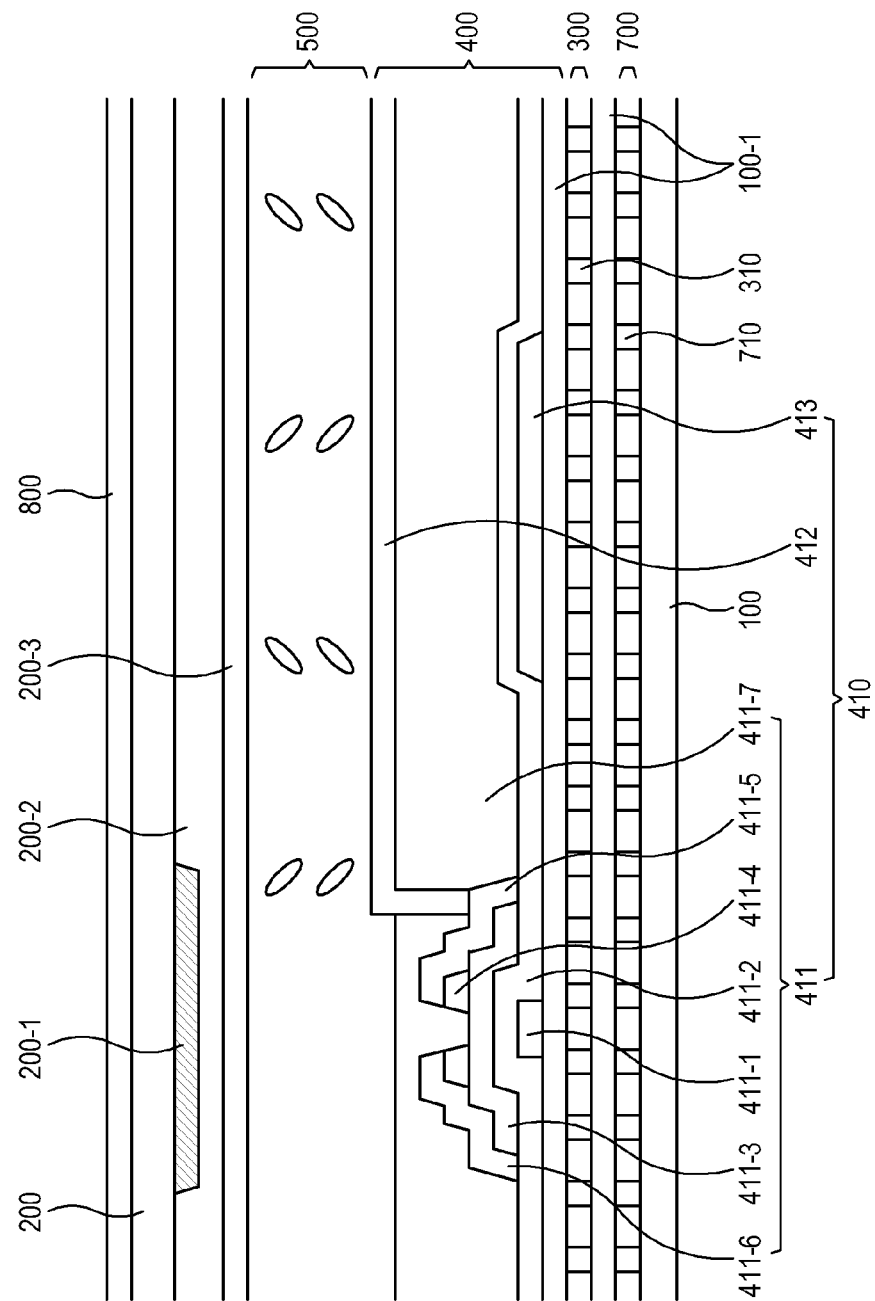
FIG. 20 is a cross-section view of a display panel according to still another exemplary embodiment.

FIG. 20 is a cross-section view of a display panel according to still another exemplary embodiment. As shown therein, the display panel 1000 in this exemplary embodiment may include the polarizing film 800 on the second substrate 200 and further include the second polarizing layer 700 besides the color filter layer 300 on the first substrate 100.

The second polarizing layer 700 may further include a third metal linear grid 710 that contains substantially the same metal as metal contained in the first metal linear grid 310 and is arranged in the same direction as the first metal linear grid 310. The third metal linear grid 710 is arranged in the same direction as the first metal linear grid 310, and thus transmits the first polarized component.

Figure 21:
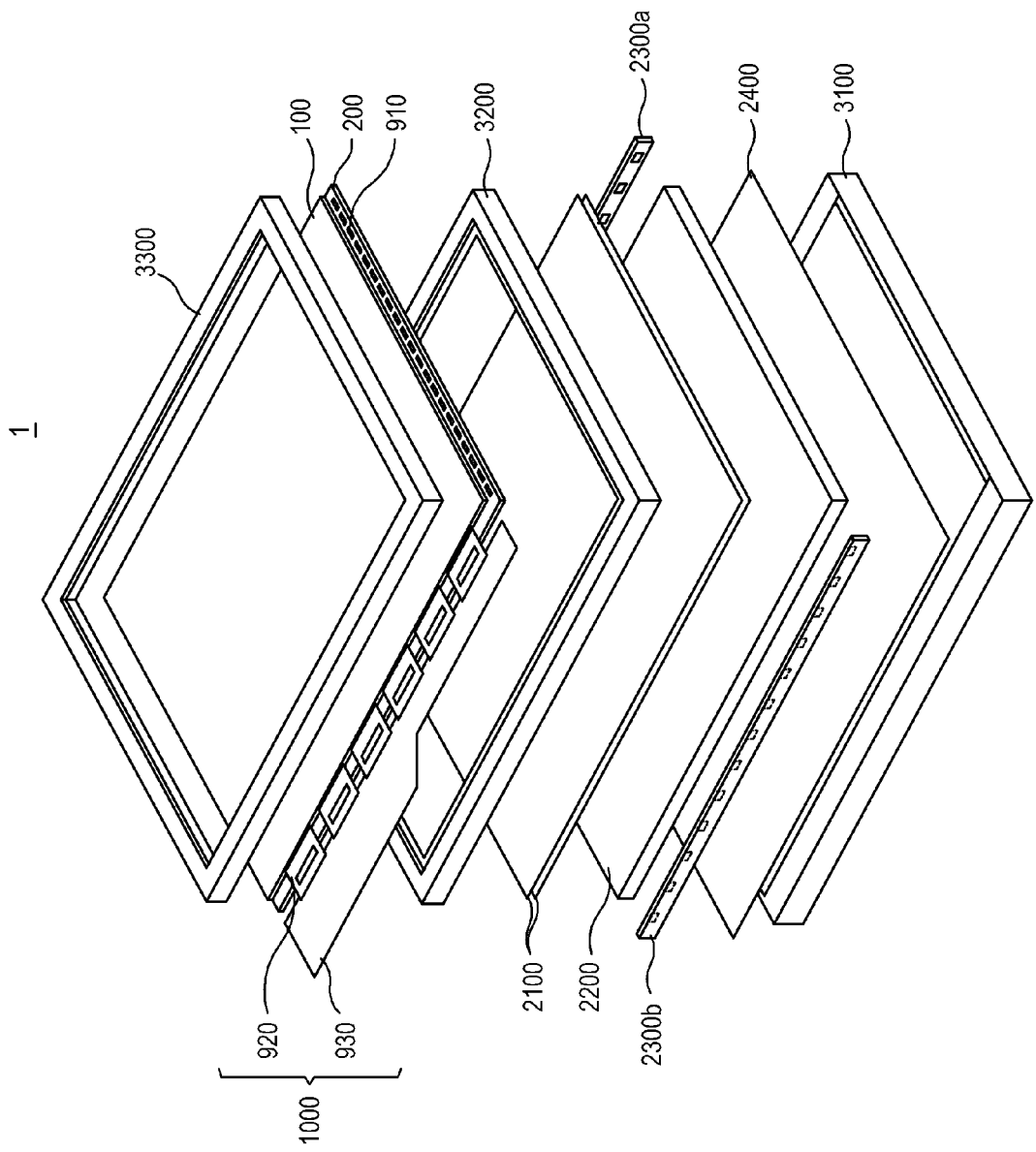
FIG. 21 is a schematic view of a display apparatus according to an exemplary embodiment.
Figure 22:
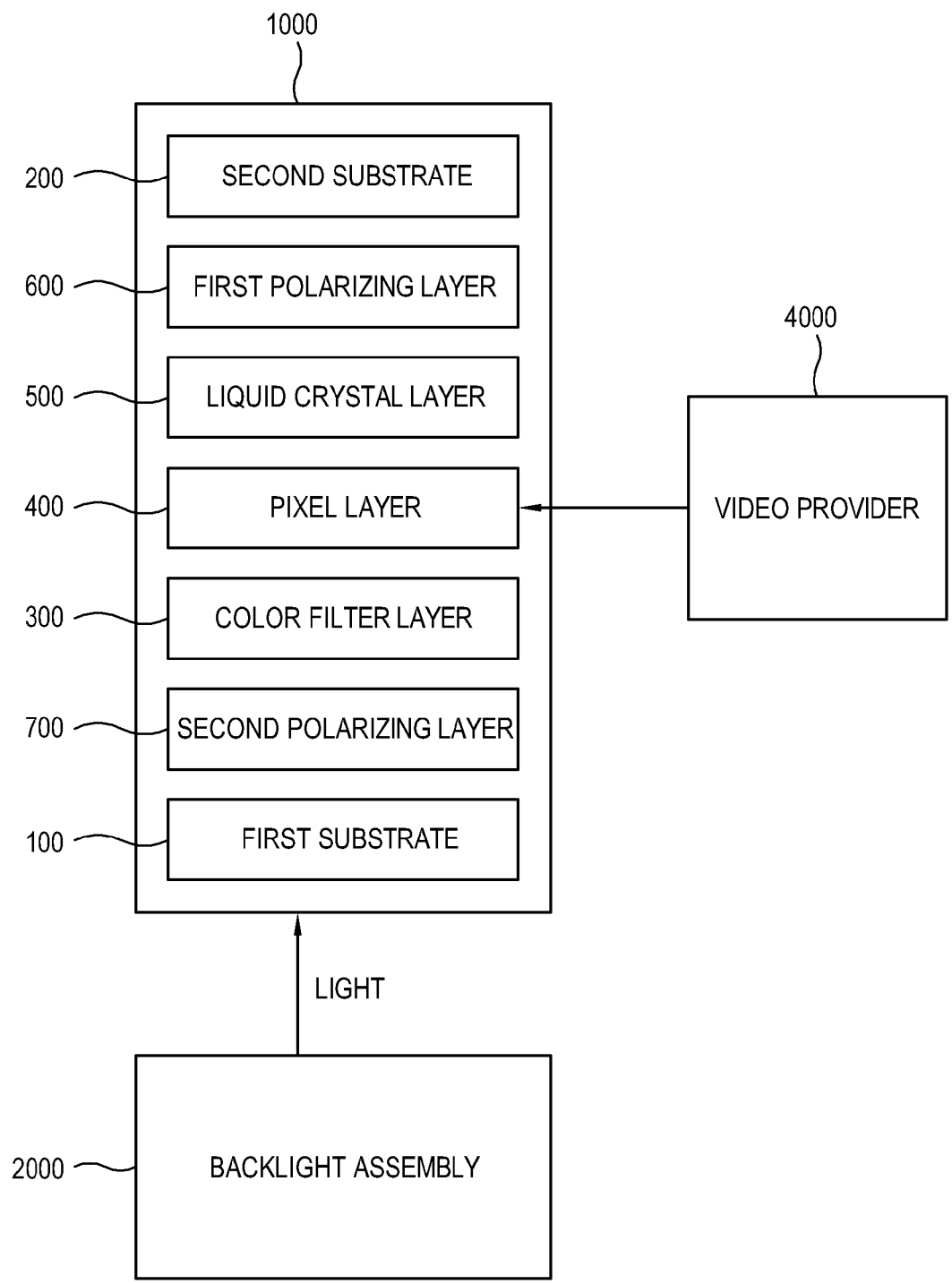
FIG. 22 is a control block diagram of a display apparatus according to an exemplary embodiment.

FIG. 21 is a schematic view of a display apparatus according to an exemplary embodiment, and FIG. 22 is a control block diagram of a display apparatus according to an exemplary embodiment.

As shown therein, the display apparatus 1 includes the display panel 1000, the backlight assembly 2000, accommodating containers 3100, 3200, 3300 accommodating them, and a video provider 4000 (see FIG. 22).

The display panel 1000 includes the first substrate 100, the second substrate 200 opposite to the first substrate 100, the liquid crystal layer (not shown) interposed between the first substrate 100 and the second substrate 200, and a panel driver for driving the pixel layer 400 to display a video signal. The panel driver may include a gate driving IC 910, a data chip film package 920, and a printed circuit board 930.

The first substrate 100 and the second substrate 200 may be formed with the pixel layer 400, the color filter polarizing layer 300, the first polarizing layer 600, the black matrix 200-1, the common electrode 200-3, etc. The color filter polarizing layer 300 polarizes the incident light entering the first substrate 100, and the first polarizing layer 600 polarizes light exiting through the display panel 1000.

The display panel 1000 receives external light and controls intensity of light passing through the liquid crystal layer interposed between the first substrate 100 and the second substrate 200, thereby displaying an image.

The gate driving IC 910 is integrated and formed on the first substrate 100, and connected to each gate line (not shown) formed on the first substrate 100. Further, the data chip film package 920 may be connected to each data line (not shown) formed on the first substrate 100. Here, the data chip film package 920 may include a tape automated bonding (TAB) tape where a semiconductor chip is adhered to a wiring pattern formed on a base film by TAB technology. As an example of the chip film package, a tape carrier package (TCP), a chip on film (COF), etc. may be used.

Meanwhile, the printed circuit board 930 may be mounted with driving components for inputting a gate driving signal to a gate driving IC 931 and for inputting a data driving signal to a data chip film package 920.

The backlight assembly 2000 may include a light guide plate 2200 for guiding light, first and second light sources 2300a and 2300b for emitting light, a reflective sheet 2400 placed beneath the light guide plate 2200, and one or more optical sheets 2100.

The light guide plate 2200 serves to guide the light to be supplied to the display panel 1000. The light guide plate 2200 may be made of transparent plastic panel such as acryl, and guide light emitted from the first and second light sources 2300a and 2300b to travel toward the display panel 1000 formed on the light guide plate 2000. On the rear of the light guide plate 2200, there may be various patterns for changing a traveling direction of the light entering the inside of the light guide plate 2200 toward the display panel 1000.

As shown in FIG. 21, the first light source 2300a and the second light source 2300b may include a light emitting diode (LED) as a point light source. The light source is not limited to the LED, and may include a line light source such as a cold cathode fluorescent lamp (CCFL) or a hot fluorescent lamp (HCFL). The first light source 2300a and the second light source 2300b are electrically connected to an inverter (not shown) supplying power, and receive the power.

The reflective sheet 2400 is provided under the light guide plate 2200 and reflects the light emitted under the light guide plate 2200 upward. Specifically, the light, which is not reflected by a fine dot pattern formed on the back of the light guide plate 2200, is reflected toward the light guide plate 2200, thereby decreasing loss in the light entering the display panel 1000 and enhancing uniformity of light transmitting through the exit surface of the light guide plate 2200.

One or more optical sheets 2100 are provided on the top of the light guide plate 2200 and serve to diffuse and condense the light transmitted from the light guide plate 2200. The optical sheets 2100 may include a diffusion sheet, a prism sheet, a protection sheet, etc. The diffusion sheet may be placed between the light guide plate 2200 and the prism sheet, and diffuses incident light from the light guide plate 2200 to thereby prevent the light from being partially concentrated. The prism sheet may include triangular prisms regularly arranged on the top thereof, and serve to condense the light diffused by the diffusion sheet in a direction perpendicular to the display panel 1000. The protection sheet may be formed on the prism sheet, protect the surface of the prism sheet, and diffuse and thus uniformly distribute the light.

The accommodating container may include a lower accommodating container 3100, a middle accommodating container 3200 and an upper accommodating container 3300. The lower accommodating container 3100 may accommodate the reflective sheet 2400, the first and second light sources 2300a and 2300b, the light guide plate 2200, and one or more optical sheets 2100. The lower accommodating container 3100 may be made of metal to have strength protecting against external shock and the ability to serve as ground.

The video provider 4000 connects with the display panel 1000 and provides a video signal. Although not shown in FIG. 21, the video provider 4000 may be arranged on the reflective sheet 2400 and the lower accommodating container 3100, or may be placed on the rear of the lower accommodating container 3100.

Figure 23:
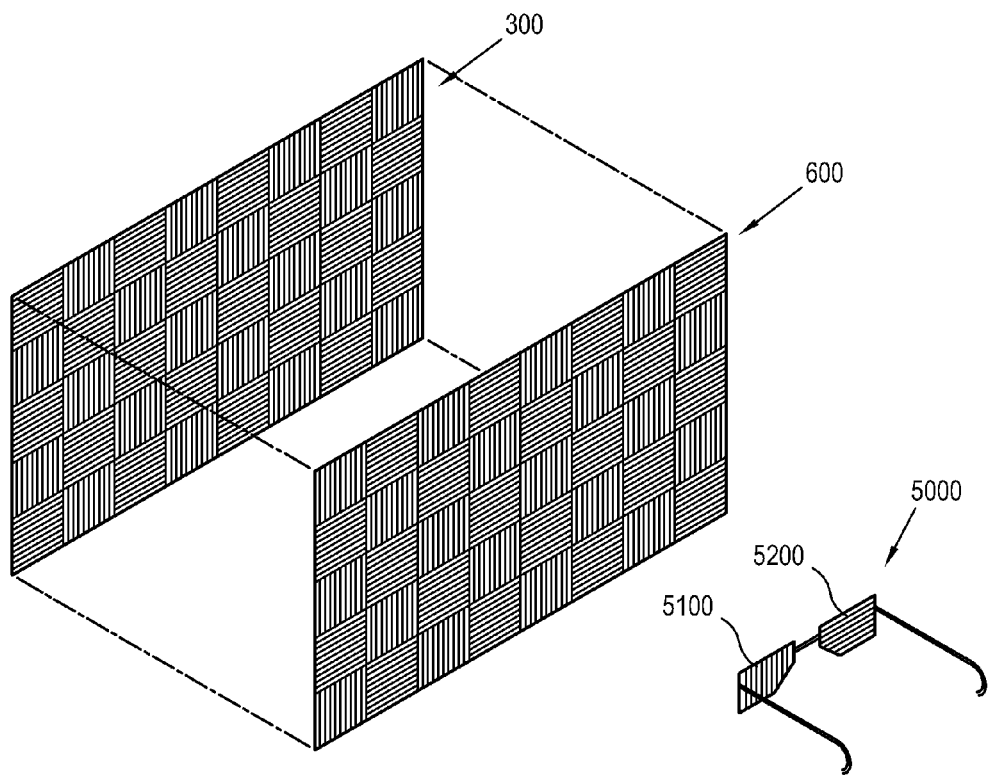
FIG. 23 is a view of explaining display of a three-dimensional image (3D image) in a display apparatus according to an exemplary embodiment.

FIG. 23 is a view for explaining display of a three-dimensional (3D) image in a display apparatus according to an exemplary embodiment.

FIG. 23 illustrates the color filter polarizing layer 300 provided in the form of a checkerboard, the first polarizing layer 600 and a polarization glasses 5000. The display apparatus according to this exemplary embodiment includes the display panel 1000, and the polarization glasses 5000 for respectively viewing the left-eye image and the right-eye image displayed on the display panel 1000.

The polarization glasses 5000 includes a left-eye lens 5100 and a right-eye lens 5200 which respectively transmit polarized components perpendicular to each other, i.e., the first polarized component and the second polarized component. The left-eye lens 5100 and the right-eye lens 5200 transmit differently polarized light, respectively. Thus, the light transmitting the left-eye lens 5100 cannot transmit the right-eye lens 5200, and the light transmitting the right-eye lens 5200 cannot transmit the left-eye lens 5100.

In this exemplary embodiment, the video provider 4000 applies left-eye image data and right-eye image data to the sub pixel 410 corresponding to the cells so that the left-eye image and the right-eye image can be alternately displayed on the adjacent cells of the checker board. The left-eye image and the right-eye image can transmit to only one of the two lenses 5100 and 5200 in accordance with the polarized state. Thus, a user combines the left-eye image and the right-eye image viewed through his/her two eyes and senses the images as the 3D image.

On the outer surface of the second substrate where the light exits, the polarizer may be provided for changing the linearly polarized light into circularly polarized light. Also, the polarization glasses 5000 may include a circular-polarization polarizer for transmitting the circularly polarized light.

In the display apparatus according to this exemplary embodiment, the first metal linear grid 310 and the second metal linear grid 610 are formed in the display panel 1000 in the form of the checkerboard, thereby facilitating realization of a passive-type 3D image. In the case of displaying a 3D image in the passive mode, the left-eye image and the right-eye image have to be spatially divided. At this time, if the polarizing film is used, there are shortcomings that the resolution of the image is lowered. The display panel 1000 in this exemplary embodiment can change a polarized state into a checkerboard form, so that a high-quality 3D image can be provided without lowering the resolution a user senses.

The display panel 1000 included in the display apparatus according to this exemplary embodiment may display the left-eye image and the right-eye image by a timesharing in accordance with shutter-type glasses. Also, the polarized state of the display panel 1000 may be changed with respect to rows or columns as shown in FIG. 17.

Figure 24:
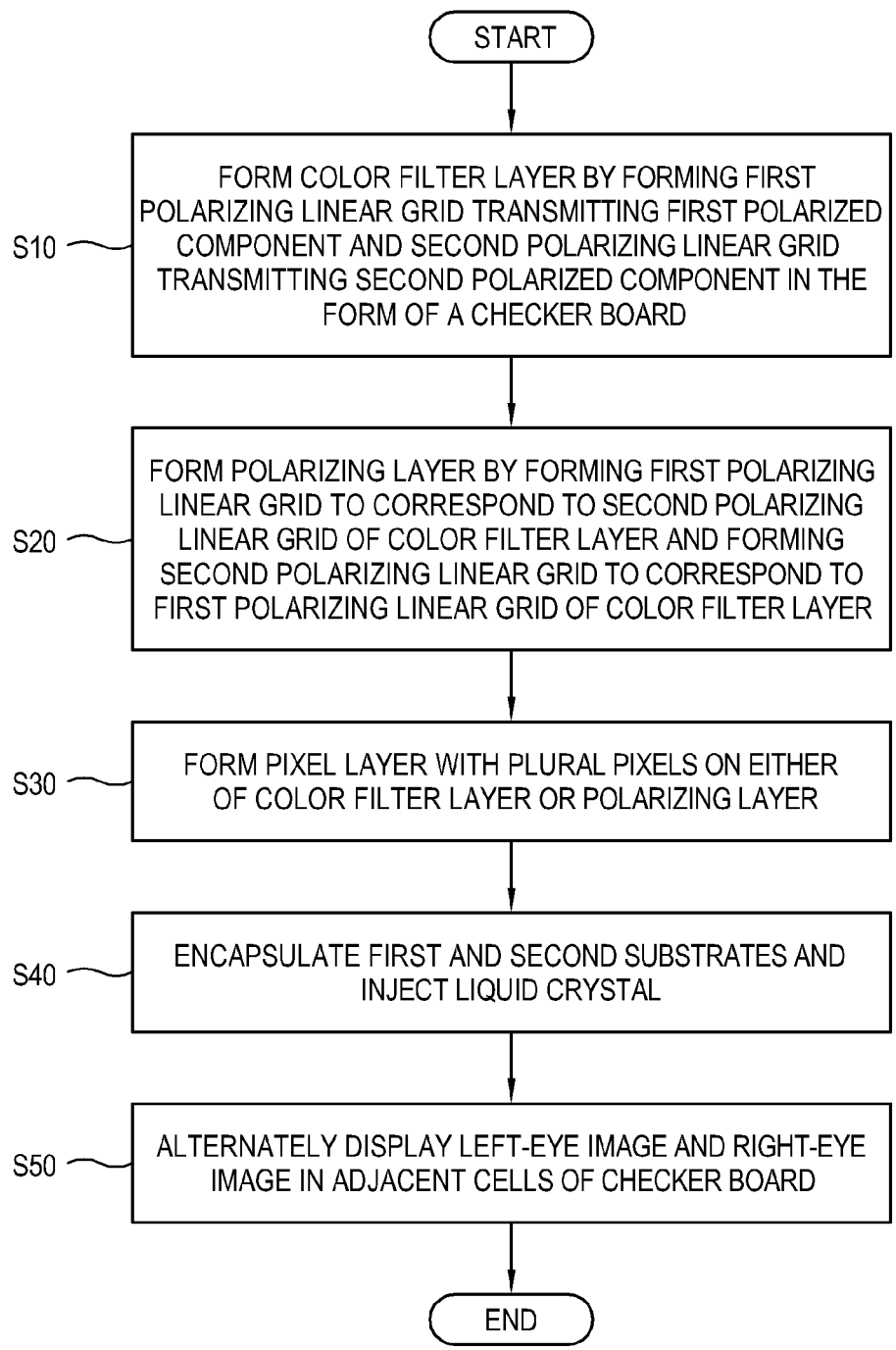
FIG. 24 is a view for explaining a manufacturing method of the display apparatus of FIG. 23.

FIG. 24 is a view for explaining a manufacturing method of the display apparatus of FIG. 23.

First, at operation S10, the first polarizing linear grid P-1 transmitting the first polarizing component and the second polarizing linear grid P-2 transmitting the second polarizing component are provided in the form of the checkerboard on the first substrate 100, thereby forming the color filter layer 300. The first metal linear grid 310 of the color filter layer 300 is arranged with different pitches so as to emit light of different colors such as red, green and blue. The red metal linear grid arranged at every pitch shorter than ½ of a red light wavelength is formed corresponding to the sub pixel 410 for emitting red light, the green metal linear grid arranged at every pitch shorter than ½ of a green light wavelength is formed corresponding to the sub pixel 410 for emitting green light, and the blue metal linear grid arranged at every pitch shorter than ½ of a blue light wavelength is formed corresponding to the sub pixel 410 for emitting blue light. The first metal linear grid 310 is formed by sequentially stacking and patterning the first metal layer 311, the insulating layer 313 and the second metal layer 315.

On the top of the first metal linear grid 310, the light absorbing layer 330 may be formed to absorb not the light from the backlight assembly 2000 but the incident light from the exterior.

Then, at operation S20, the first polarizing layer 600 is formed on the second substrate 200 so that the first polarizing linear grid P-1 can correspond to the second polarizing linear grid P-2 of the color filter layer 300 and the second polarizing linear grid P-2 can correspond to the first polarizing linear grid P-1 of the color filter layer 300.

At operation S30, the pixel layer 400 including a plurality of sub pixels 410 is formed on the top of either of the color filter layer 300 or the first polarizing layer 600. If the pixel layer 400 is formed on the same substrate as the color filter layer 300, the pixel layer 400 may be formed before the first polarizing layer 600 is formed. If the pixel layer 400 is formed on the same substrate as the first polarizing layer 600, the pixel layer 400 may be formed before the color filter layer 300 is formed.

Next, at operation S40, the first substrate 100 and the second substrate 200 are encapsulated, and the liquid crystal is injected.

The video provider 4000 capable of supplying video data to the sub pixels 410 and the panel driver 900 for driving the pixel layer 400 are connected to the substrate, and the left-eye image data and the right-eye image data are applied to the sub pixels 410 so that the left-eye image and the right-eye image can be alternately displayed in the adjacent cells of the checkerboard. Accordingly, a user combines the left-eye image and the right-eye image viewed through the polarization glasses 5000 and thus senses the images as the 3D image.

As described above, according to an exemplary embodiment, there are provided a display panel and a display apparatus comprising the same, in which manufacturing costs are decreased and a manufacturing process is simplified.

According to another exemplary embodiment, there are provided a display panel improved in optical efficiency and a display apparatus comprising the same.

According to still another exemplary embodiment, there are provided a display apparatus which can display a passive type stereoscopic image excellent in visibility.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display panel comprising:
a liquid crystal layer;
first and second substrates which are disposed at opposite sides of the liquid crystal layer; and
a color filter layer which is disposed between the first and second substrates, and comprises a first metal linear grid arranged at different pitches to emit a first polarized component of incident light with different colors;
a first polarizing layer comprising a second metal linear grid disposed between the liquid crystal layer and the second substrate for transmitting a second polarized component of the incident light different from the first polarized component of the incident light; and
a second polarizing layer disposed between the first substrate and the color filter layer for transmitting the first polarized component of the incident light,
wherein the second polarizing layer is formed on a surface of the first substrate,
the color filter layer is formed on the second polarizing layer, and
the first polarizing layer is formed on a surface of the second substrate.

2. The display panel according to claim 1, wherein the second polarizing layer comprises a third metal linear grid capable of transmitting the first polarized component of the incident light.

3. The display panel according to claim 2, further comprising a pixel layer formed on one of the surfaces between the first and second substrates and having a pixel comprising a plurality of sub pixels,
wherein at least three sub pixels having a different pitch are formed on the first metal linear grids.

4. The display panel according to claim 2, wherein
the first metal linear grid comprises a red metal linear grid, a green metal linear grid and a blue metal linear grid, and
the red metal linear grid has a pitch shorter than ½ of a red light wavelength, the green metal linear grid has a pitch shorter than ½ of a green light wavelength, and the blue metal linear grid has a pitch shorter than ½ of a blue light wavelength.

5. The display panel according to claim 2, wherein the first metal linear grid comprises a first metal layer, an insulating layer, and a second metal layer stacked in sequence.

6. The display panel according to claim 5, wherein a height of the first metal linear grid is larger than the width thereof.

7. The display panel according to claim 2, wherein the color filter layer further comprises a dielectric layer formed between the first metal linear grid and one of the first and second substrates.

8. The display panel according to claim 2, wherein the first metal linear grid comprises a first polarizing linear grid transmitting the first polarized component, and a second polarizing linear grid transmitting the second polarized component, and
the color filter layer is shaped in the form of a checkerboard, and the first polarizing linear grid and the second polarizing linear grid are alternately formed in adjacent cells of the checkerboard, and
wherein the second metal linear grid comprises a first polarizing linear grid transmitting the first polarized component, and a second polarizing linear grid transmitting the second polarized component, and
the first polarizing linear grid of the second metal linear grid corresponds to the second polarizing linear grid of the first metal linear grid, and the second polarizing linear grid of the second metal linear grid corresponds to the first polarizing linear grid of the first metal linear grid.

9. The display panel according to claim 8, further comprising a pixel layer formed on the surface between the first and second substrates, and comprising a pixel comprising a plurality of sub pixels,
wherein a cell of the checkerboard of the color filter layer is formed to correspond to the pixel.

10. The display panel according to claim 2, wherein the first metal linear grid comprises a first polarizing linear grid transmitting the first polarized component, and a second polarizing linear grid transmitting the second polarized component, and
the color filter layer is divided into a plurality of rows or a plurality of columns, and
the first polarizing linear grid and the second polarizing linear grid are alternately formed in the plurality of rows or the plurality of columns of the color filter layer, and
wherein the second metal linear grid comprises a first polarizing linear grid transmitting the first polarized component, and a second polarizing linear grid transmitting the second polarized component, and
the first polarizing linear grid of the second metal linear grid corresponds to the second polarizing linear grid of the first metal linear grid, and the second polarizing linear grid of the second metal linear grid corresponds to the first polarizing linear grid of the first metal linear grid.

11. The display panel according to claim 10, further comprising a pixel layer formed on the surface between the first and second substrates, and comprising a pixel comprising a plurality of sub pixels,
wherein the plurality of rows or the plurality of columns of the color filter layer are formed to correspond to a pixel row or a pixel column.

12. The display panel according to claim 1, wherein the first metal linear grid comprises a metal having a first reflectivity, and the second metal linear grid comprises a metal having a second reflectivity lower than the first reflectivity.

13. A display panel comprising:
a liquid crystal layer;
first and second substrates which are disposed at opposite sides of the liquid crystal layer;
a color filter layer which is disposed between the first and second substrates, and comprises a first metal linear grid arranged at different pitches to emit a first polarized component of incident light with different colors;
a first polarizing layer comprising a polarizing film disposed between the liquid crystal layer and the second substrate for transmitting a second polarized component of the incident light different from the first polarized component of the incident light; and
a second polarizing layer disposed between the first substrate and the color filter layer for transmitting the first polarized component of the incident light.

14. A display apparatus comprising:
a display panel comprising a liquid crystal layer, first and second substrates which are disposed at opposite sides of the liquid crystal layer, a color filter layer which is disposed between the first and second substrates, and comprises a first metal linear grid arranged at different pitches to emit a first polarized component of incident light with different colors, a first polarizing layer comprising a second metal linear grid disposed between the liquid crystal layer and the second substrate for transmitting a second polarized component of the incident light different from the first polarized component of the incident light, and a second polarizing layer disposed between the first substrate and the color filter layer for transmitting the first polarized component of the incident light; and a backlight assembly which emits light to the display panel, wherein the second polarizing layer is formed on a surface of the first substrate, the color filter layer is formed on the second polarizing layer, and the first polarizing layer is formed on a surface of the second substrate.

15. The display apparatus according to claim 14, wherein the second polarizing layer comprises a third metal linear grid capable of transmitting the first polarized component of the incident light.

16. The display apparatus according to claim 15, wherein the first polarizing layer further comprises a pixel layer formed on one of the surfaces between the first and second substrates and comprises a pixel comprising a plurality of sub pixels, and at least three sub pixels of the first metal linear grids have a different pitch.

17. The display apparatus according to claim 15, wherein the first metal linear grid comprises a red metal linear grid, a green metal linear grid and a blue metal linear grid, and the red metal linear grid has a pitch shorter than ½ of a red light wavelength, the green metal linear grid has a pitch shorter than ½ of a green light wavelength, and the blue metal linear grid has a pitch shorter than ½ of a blue light wavelength.

18. The display apparatus according to claim 15, wherein the first metal linear grid comprises a first metal layer, an insulating layer, and a second metal layer stacked in sequence.

19. The display apparatus according to claim 15, wherein the first metal linear grid comprises a first polarizing linear grid transmitting the first polarized component, and a second polarizing linear grid transmitting the second polarized component, and the color filter layer is divided in form of a checkerboard, and the first polarizing linear grid and the second polarizing linear grid are alternately arranged in adjacent cells of the checkerboard of the color filter layer, and wherein the second metal linear grid comprises a first polarizing linear grid transmitting the first polarized component, and a second polarizing linear grid transmitting the second polarized component, and the first polarizing linear grid of the second metal linear grid corresponds to the second polarizing linear grid of the first metal linear grid, and the second polarizing linear grid of the second metal linear grid corresponds to the first polarizing linear grid of the first metal linear grid.

20. The display apparatus according to claim 19, wherein the display panel further comprises a pixel layer formed on one of the surfaces between the first and second substrates, and comprising a pixel comprising a plurality of sub pixels, and the display apparatus further comprises a video provider to provide a video signal to the display panel so that a left-eye image and a right-eye image are alternately displayed in adjacent cells of the checkerboard.

21. The display apparatus according to claim 20, wherein a cell of the checkerboard of the color filter is formed to correspond to the pixel.

22. The display apparatus according to claim 20, further comprising polarization glasses which comprises a first lens transmitting the first polarized component and a second lens transmitting the second polarized component.

23. The display apparatus according to claim 15, wherein the first metal linear grid comprises a first polarizing linear grid transmitting the first polarized component, and a second polarizing linear grid transmitting the second polarized component, and the color filter layer is divided into a plurality of rows or a plurality of columns, and the first polarizing linear grid and the second polarizing linear grid are alternately formed in the plurality of rows or the plurality of columns of the color filter, and wherein the second metal linear grid comprises a first polarizing linear grid transmitting the first polarized component, and a second polarizing linear grid transmitting the second polarized component, and the first polarizing linear grid of the second metal linear grid corresponds to the second polarizing linear grid of the first metal linear grid, and the second polarizing linear grid of the second metal linear grid corresponds to the first polarizing linear grid of the first metal linear grid.

24. The display apparatus according to claim 23, further comprising a pixel layer formed on one of the surfaces between the first and second substrates, and comprising a pixel comprising a plurality of sub pixels, and the display apparatus further comprises a video provider to provide a video signal to the display panel so that a left-eye image and a right-eye image are alternately displayed in the plurality of rows and the plurality of columns of the color filter.

25. The display apparatus according to claim 24, wherein the plurality of rows or the plurality of columns of the color filter are formed to correspond to a pixel row or a pixel column.

26. The display apparatus according to claim 24, further comprising polarization glasses which comprise a first lens transmitting the first polarized component and a second lens transmitting the second polarized component.

27. The display apparatus according to claim 14, wherein the color filter layer further comprises a dielectric layer formed between the first metal linear grid and one of the first and second substrates.

28. The display apparatus according to claim 14, wherein the first metal linear grid comprises a metal having a first reflectivity, and the second metal linear grid comprises a metal having a second reflectivity lower than the first reflectivity.

29. A display apparatus comprising:

a display panel comprising a liquid crystal layer, first and second substrates which are disposed at opposite sides of the liquid crystal layer, a color filter layer which is disposed between the first and second substrates, and comprises a first metal linear grid arranged at different pitches to emit a first polarized component of incident light with different colors, a first polarizing layer comprising a polarizing film disposed between the liquid crystal layer and the second substrate for transmitting a second polarized component of the incident light different from the first polarized component of the incident light, and a second polarizing layer disposed between the first substrate and the color filter layer for transmitting the first polarized component of the incident light; and a backlight assembly which emits light to the display panel.

* * * * *